United States Patent [19]
Murata

[11] Patent Number: 5,388,678
[45] Date of Patent: Feb. 14, 1995

[54] FLUID COUPLING POWER TRANSMISSION WITH LOCKUP CLUTCH

[75] Inventor: Kiyohito Murata, Susono, Japan

[73] Assignee: Toyota Jidosha Kabushiki Kaisha, Toyota, Japan

[21] Appl. No.: 83,538

[22] Filed: Jun. 30, 1993

[30] Foreign Application Priority Data

| Jul. 3, 1992 | [JP] | Japan | 4-200585 |
| Jul. 3, 1992 | [JP] | Japan | 4-200586 |
| Jul. 3, 1992 | [JP] | Japan | 4-200587 |
| Jul. 3, 1992 | [JP] | Japan | 4-200588 |
| Jul. 10, 1992 | [JP] | Japan | 4-207405 |

[51] Int. Cl.⁶ ............................................. F16H 45/02
[52] U.S. Cl. ........................... 192/3.29; 192/3.31
[58] Field of Search ............ 192/3.29, 3.28, 3.31, 192/3.33

[56] References Cited

U.S. PATENT DOCUMENTS

| 4,844,216 | 7/1989 | Fukushima | 192/3.29 X |
| 5,062,517 | 11/1991 | Muchmore et al. | |
| 5,086,892 | 2/1992 | Schierling | |
| 5,121,821 | 6/1992 | Poorman et al. | 192/3.29 X |
| 5,129,493 | 4/1992 | Edmunds | |
| 5,195,621 | 3/1993 | Dull et al. | 192/3.29 |

FOREIGN PATENT DOCUMENTS

| 0096964 | 12/1983 | European Pat. Off. | |
| 0321697 | 6/1989 | European Pat. Off. | |
| 533426 | 3/1993 | European Pat. Off. | 192/3.29 |
| 3938724 | 5/1991 | Germany | |
| 63-251661 | 10/1988 | Japan | |
| 63-251662 | 10/1988 | Japan | |
| 63-251663 | 10/1988 | Japan | |
| 63-251664 | 10/1988 | Japan | |
| 4-151056 | 5/1992 | Japan | |
| 5-79547 | 3/1993 | Japan | 192/3.28 |
| 2255395 | 11/1992 | United Kingdom | |

Primary Examiner—Andrea L. Pitts
Attorney, Agent, or Firm—Oblon, Spivak, McClelland, Maier & Neustadt

[57] ABSTRACT

A fluid coupling power transmission having a lockup clutch, in which a housing is formed by the shell of a pump impeller and a front cover integrally connected to the shell, in which a turbine runner facing the pump impeller is arranged in the housing, and in which the lockup clutch is disposed in the housing for transmitting a torque selectively between the housing and an output member integrated with the turbine runner. The fluid coupling power transmission comprises: a damper mechanism including a rotational inertial mass made rotatable relative to the housing and selectively engageable with the lockup clutch, and elastic members arranged between the rotational inertial mass and a drive side member made rotatable together with the housing, and adapted to be compressed by the relative rotation of the rotational inertial mass and the drive side member; and a friction mechanism for establishing a sliding frictional force for suppressing the rotation of the rotational inertial mass relative to the drive side member if the relative rotation exceeds a predetermined angle.

18 Claims, 27 Drawing Sheets

DIAGRAM OF TORSION RIGIDITY

FLUID COUPLING POWER TRANSMISSION WITH LOCKUP CLUTCH

DESCRIPTION OF THE RELATED ART

The present invention relates to an automatic transmission for vehicles and, more particularly, to a fluid coupling power transmission such as a torque converter equipped with a lockup clutch.

The fluid coupling power transmission such as a torque converter does not always have an excellent transmission efficiency, as well known in the art, because it transmits torque through fluid. In recent years, therefore, it is a current practice to incorporate a lockup clutch into the torque converter so as to improve the power transmission efficiency and accordingly the fuel economy. Since the lockup clutch effects direct connections between the input and output members of the torque converter by mechanical means, it will transmit the vibration resulting from a fluctuation in the input torque, too. In the current practice, therefore, the lockup clutch is employed together with a damper mechanism.

Generally speaking, this damper mechanism is interposed between the output member such as a hub bearing a turbine runner and the lockup clutch. In the prior art, however, the existing damper mechanism will allow a weak vibration to be transmitted as it is, so that it is liable to have a booming noise at a high level. In order to avoid this disadvantage, it is conceivable to connect the damper mass having a large rotational inertial mass to the input (or drive) side member such as the housing through damper springs so that the lockup clutch may engage with the damper mass. With this construction, the damper mass acts as a high inertial resistance against the fluctuation of the input torque. As a result, this fluctuation of the input torque can be absorbed by the damper springs to attenuate the vibration and to prevent the booming noise.

The fluid coupling power transmission described above is excellent in the vibration attenuating characteristics because the inertial resistance by the damper mass is high. However, in case of a high fluctuation of the input torque, e.g., in case the accelerator is abruptly turned ON or OFF, for example, the extent of warpage of the damper springs, i.e., the amount of elastic energy to be stored by the damper springs grows excessively high. When the lockup clutch is released, the elastic energy is abruptly discharged. In this case, the damper springs release the elastic energy so that a high torque is inputted to the automatic transmission through the lockup clutch. As a result, a torque fluctuation of large wavelength is caused in the output shaft of the automatic transmission so that it may be physically felt as the so-called "surging phenomenon" to deteriorate the riding comfort of the vehicle.

In order to eliminate this trouble, it is conceivable to apply a sliding friction to the relative rotation of the damper mass thereby to increase the hysteresis of the damper mechanism. However, the mere application of the sliding friction to the relative rotation of the damper mass will allow a fine vibration of high frequency to be transmitted between the drive side members and the damper mass. This transmission in turn invites a problem that the booming noise is caused to deteriorate the riding comfort of the vehicle.

Since, moreover, the aforementioned sliding friction is caused by the relative displacement between the two rotating members, a relative slippage is radially caused between the two members, if they are misaligned. Then, an excess friction may occur to deteriorate the durability, or an unbalance between the rotary members may increase to cause an unnecessary vibration. Due to the misalignment, on the contrary, the members for establishing the friction may be abnormally deformed to drop the effect of preventing the surging phenomenon.

In case, moreover, the friction member for applying the sliding friction to the relative rotation of the damper mass is simply interposed between the front cover and the damper mechanism, for example, the facial pressure of the friction face may not be stable to fail to establish the frictional force, as expected. Specifically, the torque converter has its housing thinned to have a lower weight but its internal pressure raised by the converter oil pressure applied thereto, so that the housing is expanded at the time of operating the torque converter. As a result, the size between the front cover and the damper mechanism is changed to change the contact pressure of the friction member interposed between them. Moreover, since the extent of deformation of the torque converter housing by the oil pressure is not always constant but difficult to estimate in advance, the contact pressure between the friction member and the front cover or the damper mechanism will fail to take the expected value. As a result, the effect of preventing the surging may not be achieved, but an excessive sliding friction may occur to drop the durability.

A friction mechanism for establishing the aforementioned hysteresis is obliged by the spatial restriction to use a thin plate shape and is given an elastic function by itself to retain the predetermined facial pressure. Since, in this case, the torque converter rotates in its entirety, the axis of the friction mechanism made of the thin plate member has to be accurately aligned with the axis of the entire torque converter. If the friction mechanism is axially offset from the center of rotation, the vibration or noise may be caused by the resulting eccentric rotation. With this relative slippage, moreover, the slippage may occur not only in the circumferential direction but also in the radial direction thereby to invite a disadvantage in the durability. Because of the unstable sliding friction, furthermore, the surging preventing effect may become unstable.

Thus, the friction mechanism for increasing the hysteresis of the damper mechanism incorporated into the torque converter still has an intrinsic problem to be solved. In the prior art, there is not known any means for solving that problem sufficiently to achieve the stable effect of preventing the surging phenomenon.

In the construction in which the hysteresis of the damper mechanism having the damper mass is merely increased by the sliding frictional force, the booming noise may be increased by the torque transmission of the frictional force. Specifically, if the damper mass and the drive side members are always connected through the member for causing the frictional force, a linear vibration caused by the explosive combustion in the engine at a low r.p.m. is transmitted to the output side member such as the damper mass through the member causing the frictional force, so that the booming noise is high.

Thus, both the surging phenomenon and the booming noise can be reduced if the construction is made such that the member for causing the frictional force is made to engage with the damper mass or the drive side members in case the angle of reciprocating rotation of the damper mass relative to the drive side member is increased to some extent by the abrupt increase or decrease of the input torque. In this case, however, the member for causing the frictional force comes into engagement with the damper mass or the drive side members when the relative reciprocating rotational angle of the damper mass grows to some value. At this engaging time, the torque transmission state between the damper mass and the drive side members abruptly changes. As a result, the change in the torque transmission state may be physically felt, if high, as the engaging shock to cause the deterioration of the riding comfort.

On the other hand, since the torque converter has its inside spatially restricted to a serious extent, the member for establishing the aforementioned frictional force frequently has to be a thin plate member. In this thin plate member, its edge will come into engagement with the damper mass or the drive side members. As a result, the facial pressure at the engagement portion may grow high to deteriorate the durability.

SUMMARY OF THE INVENTION

A main object of the present invention is to provide a fluid coupling power transmission with a lockup clutch, which is not only excellent in the vibration attenuating characteristics but also capable of preventing the surging phenomenon effectively.

Another object of the present invention is to provide a fluid coupling power transmission with a lockup clutch, which is not only capable of preventing the surging phenomenon effectively but also excellent in the booming noise preventing effect and the durability.

A further object of the present invention is to provide a fluid coupling power transmission with a lockup clutch, which can attain a stable surging preventing effect.

According to the present invention, therefore, there is provided a fluid coupling power transmission which comprises: a damper mechanism adapted to be selectively engaged by a lockup clutch and including a rotational inertial mass made rotatable relative to the housing and selectively engageable with the lockup clutch, and elastic members arranged between the rotational inertial mass and a drive side member made rotatable together with the housing, and adapted to be compressed by the relative rotation of the rotational inertial mass and the drive side member; and a friction mechanism for establishing a sliding frictional force for suppressing the rotation of the rotational inertial mass relative to the drive side member if the relative rotation exceeds a predetermined angle.

The friction mechanism is constructed mainly of a friction plate to be slid into contact with the inner face of a front cover forming part of the housing, so that the friction plate may rotate together with the rotational inertial mass if the drive side member and the rotational inertial mass rotate relative to each other by an angle exceeding the predetermined value.

The friction plate may be coaxially held by the drive side member or the rotational inertial mass. Then, no relative motion in the axial direction will occur to take an advantage in the improvement in the durability.

Furthermore, the friction mechanism can be constructed to engage with the rotational inertial mass if the relative rotation occurs between the drive side member and the rotational inertial mass. In this case, the impact at the engaging time can be damped by adopting an elastic mechanism as the engagement portion.

The above and further objects and novel feature of the present invention will more fully appear from the following detailed description when the same is read in connection with the accompanying drawings. It is to be expressly understood, however, that the drawings are for purpose of illustration only and are not intended as a definition of the limits of the invention.

DETAILED DESCRIPTION OF THE PREFERRED EMBODIMENTS

Figure 1:
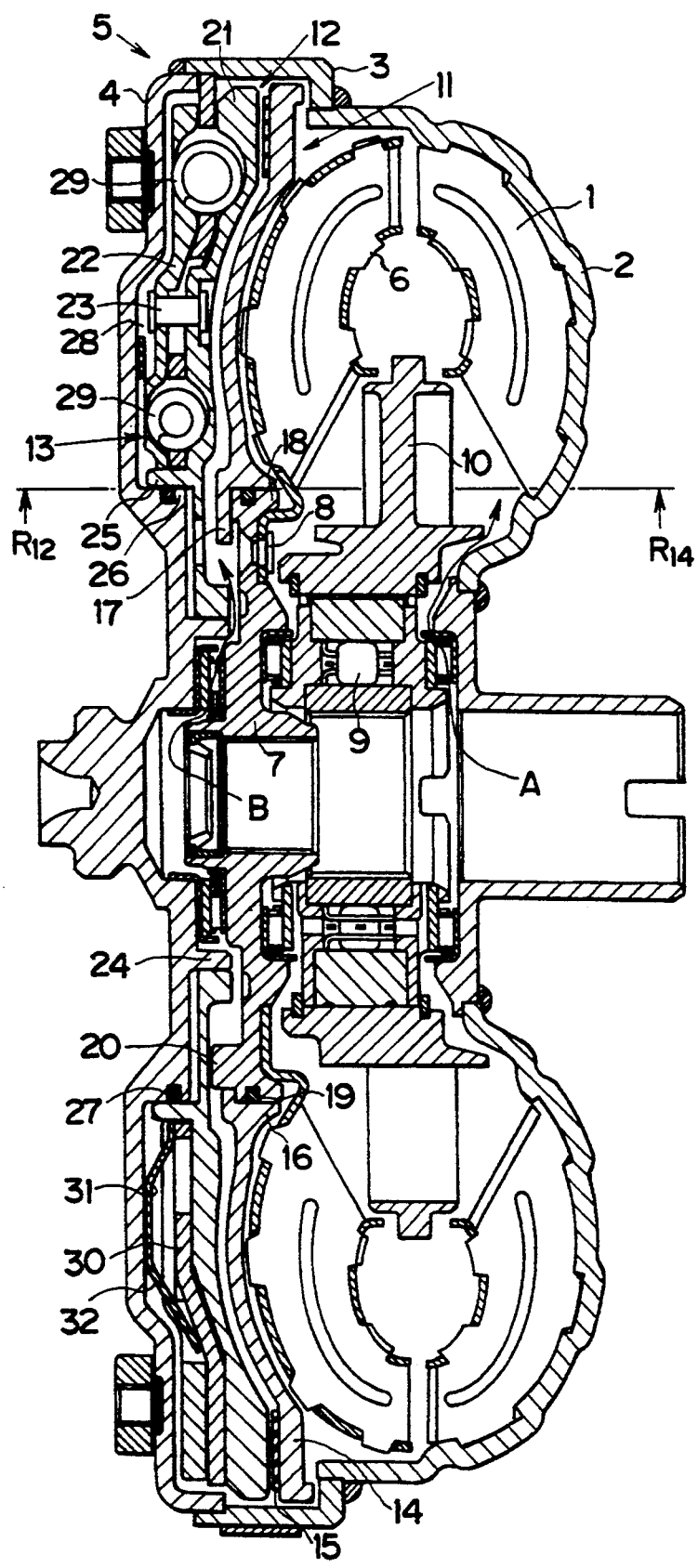
FIG. 1 is a section showing one embodiment of the present invention.

FIG. 1 is a section showing one embodiment of the present invention. A pump impeller 1 has its shell 2 integrally connected to a front cover 4 through an annular extension member 3, and these shell 2, extension member 3 and front cover 4 constitute a torque converter housing 5 altogether. In this housing 5, a turbine runner 8 is arranged to face the pump impeller 1 and has its inner circumference mounted on a hub 7 acting as an output member by means of rivets 8. Between the pump impeller 1 and the turbine runner 6 and in their inner circumferential portions, moreover, there is arranged a stator 10 which is splined to the outer race of a one-way clutch 9. Between the inner face of the front cover 4 and the turbine runner 6, on the other hand, there are arranged a damper mass 12 or a rotating inertial mass and a damper mechanism 13.

The lockup clutch 11 is composed of a lockup piston 14 or an annular plate member, which is curved along the back (as located at the lefthand side in FIG. 1) of the turbine runner 6 and a lining member 15 which is mounted on the side of the outer circumference of the lockup piston 14. This lockup piston 14 is formed in its inner circumference with a cylindrical portion 16, and this cylindrical portion 16 is formed at its one end with a plurality of projections 17 acting as engagement teeth for transmitting torque. These projections 17 are circumferentially spaced from each other at a constant pitch and projected toward the inner circumference.

The lockup piston 14 is so fitted on the aforementioned hub 7 as to slide in the axial direction. This hub 7 has a boss 18 fitting the cylindrical portion 16 of the lockup piston 14 thereon, and the hub 7 and the lockup piston 14 are sealed up liquid-tight by a seal ring 19 which is fitted in the hub 7. Moreover, the boss 18 is formed on its one side with a plurality of projections 20 which are made engageable with the aforementioned projections 17 in the circumferential direction. As a result, the torque is transmitted between the lockup piston 14 and the hub 7 through the engagement between those projections 17 and projections 20.

The damper mass 12 is composed of: a main member 21, which has an external diameter substantially equal to that of the aforementioned lockup piston 14 and an internal diameter smaller than that of the lockup piston 14 and which has a generally annular shape; and an annular cover member 22 which has a larger internal diameter but a smaller mass than those of the main member 21. These main member 21 and cover member 22 are connected in a face-to-face relation by means of rivets 23 to constitute the damper mass 12, which is arranged between the lockup piston 14 and the front cover 4. The damper mass 12 is positioned on a single axis, that is, centered with the housing 5 by fitting the inner circumference of the main member 21 rotatably on the outer circumference of an annular projection 24 which is projected from the inner circumference of the front cover 4.

Moreover, the main member 21 is formed with an annular projection 25 which has an internal diameter equal to that of the cylindrical portion 16 in the aforementioned lockup piston 14 and which is projected toward the inner face of the front cover 4. The annular projection 25 is rotatably fitted on a cylindrical portion 26 which is projected from the inner face of the front cover 4. And, these annular projection 25 and cylindrical portion 26 are sealed up liquid tight by means of a seal ring 27 which is mounted in the cylindrical portion 26. Specifically, a radius $R_{14}$ of the sealing portion at the inner circumference of the lockup piston 14 and a radius $R_{12}$ of the sealing portion at the inner circumference of the damper mass 12 are made equal. And the front cover 4 and the damper mass 12 are sealed up liquid-tight by the seal ring 27 thereby to form an oil pressure chamber 28 between the inner face of the front cover 4 and the damper mass 12.

The main member 21 and the cover member 22 constituting the damper mass 12 together are formed at their respective facing portions with a plurality of circumferential recesses which are spaced at a constant pitch for receiving damper springs 29 or coil springs. Between the main member 21 and the cover member 22, moreover, there is so sandwiched a center plate 30 or an annular plate member that it can rotate relative to the damper mass 12. On the other hand, the center plate 30 is formed with apertures fitting the aforementioned damper springs 29 therein. As a result, when the damper mass 12 and the center plate 30 rotate relative to each other, the damper springs 29 are compressed by those damper mass 12 and center plate 30.

Moreover, the center plate 30 has its outer circumference meshing with the housing 5 in the circumferential direction to transmit the torque in-between. This meshing structure can adopt a variety of structures, if necessary. For example, the aforementioned front cover 4 may have its outer circumferential leading end formed with axially protruding teeth, or the center plate 30 may have its outer circumferential end formed with radially externally protruding teeth, so that the torque may be transmitted between the housing 5 and the center plate 30 by having those teeth meshed. Thus, the center plate 30 belongs to drive side members together with the housing 5.

Figure 2:
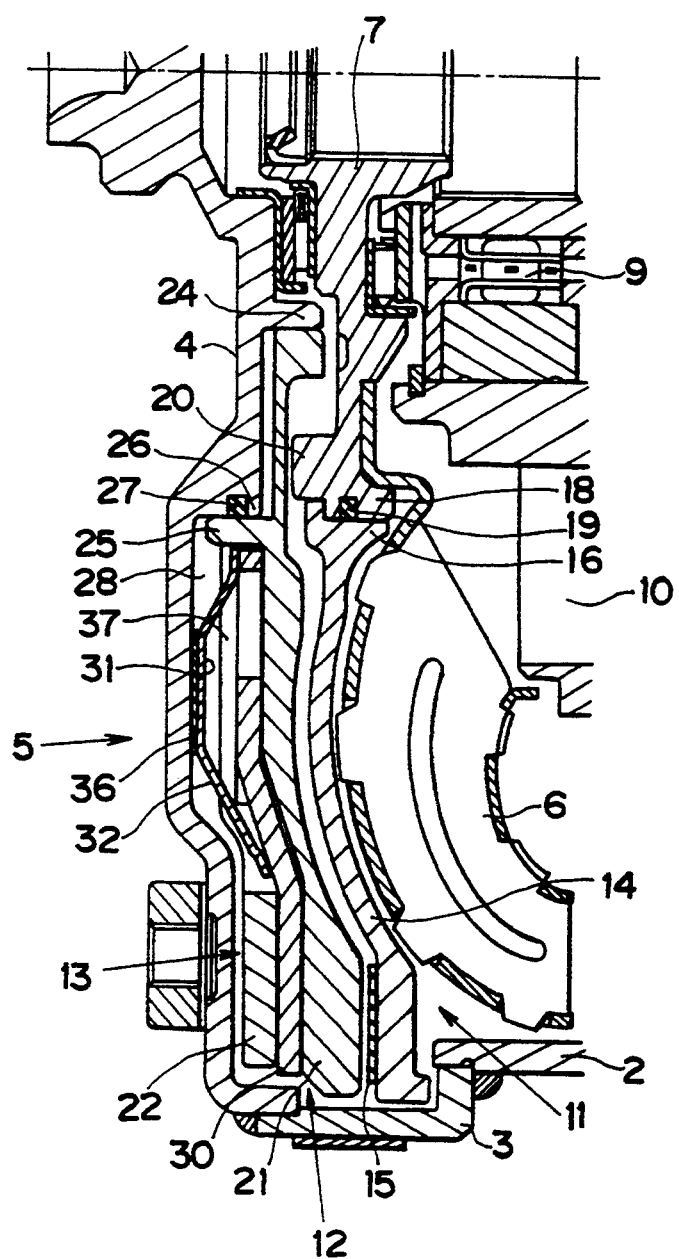
FIG. 2 is a section showing a portion of the arrangement of a friction plate.
Figure 3:
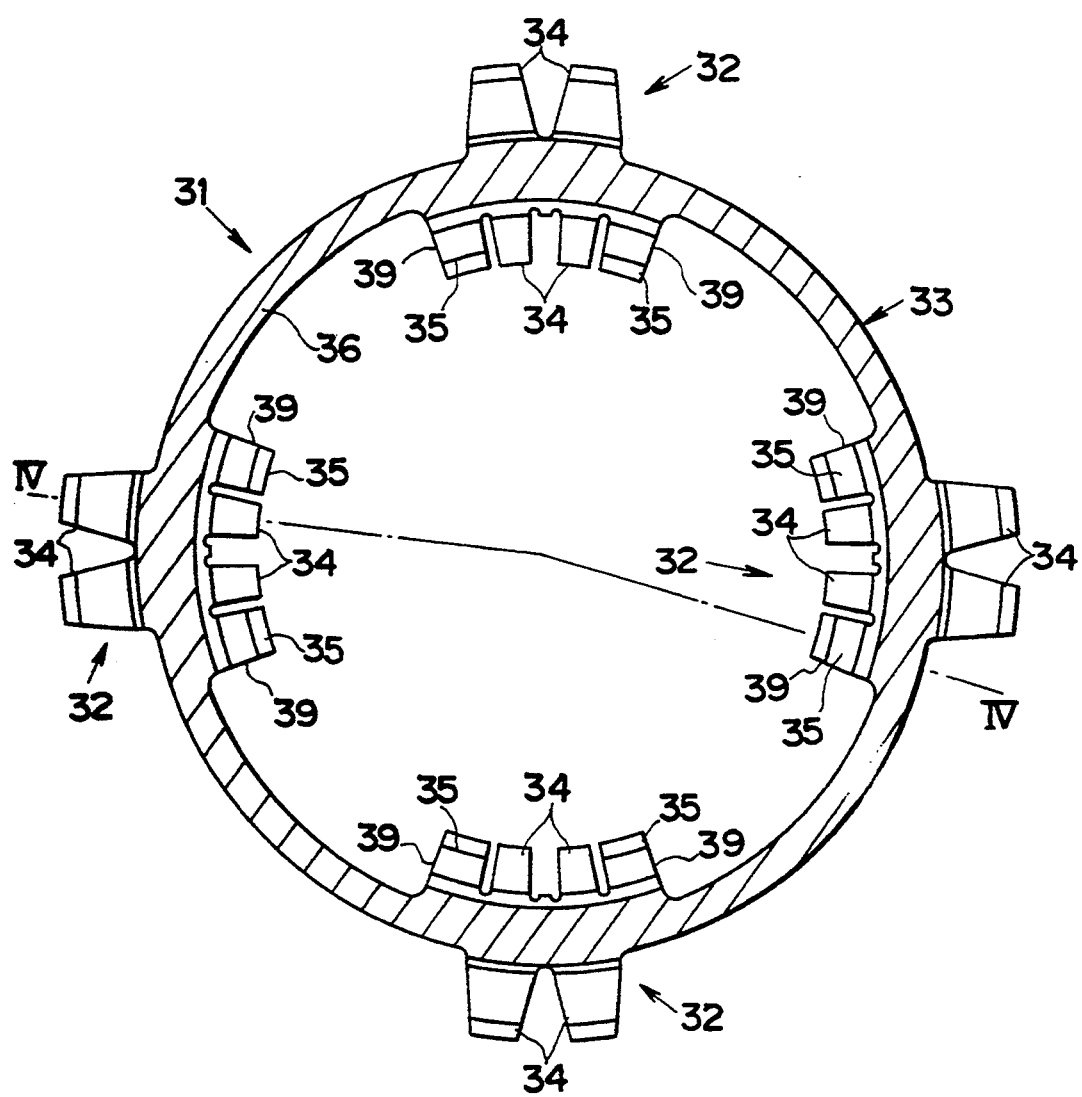
FIG. 3 is a front elevation showing the friction plate.
Figure 4:
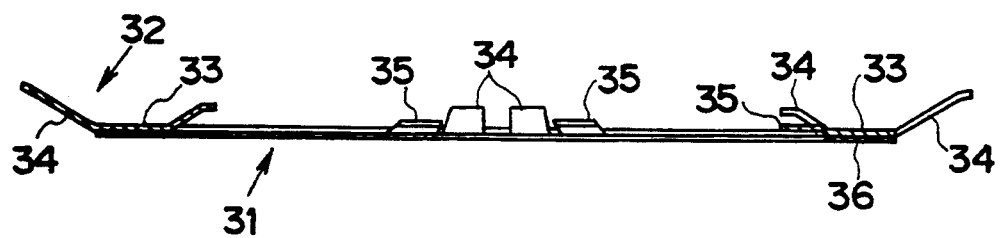
FIG. 4 a section taken along line IV—IV of FIG. 3.

The torque converter, as shown in FIG. 1, is further equipped with a friction mechanism. This friction mechanism is provided to absorb a portion of an elastic energy established from the damper spring 29, thereby to prevent the so-called "surging". In the embodiment shown in FIG. 1, the friction mechanism is constructed mainly of a friction plate 31 which is sandwiched between the inner face of the front cover 4 and the damper mechanism 13. FIG. 2 is a partial section showing the arrangement of the friction plate 31, and FIGS. 3 and 4 show the shape of the friction plate 31.

Specifically, the friction plate 31 is formed into such a dish spring having a generally annular shape that leaf spring portions 32 having an annular section for a spring action are formed at four portions of a ring portion 33 having a larger diameter than that of the annular projection 25 of the aforementioned main member 21. These leaf spring portions 32 are formed by extending a pair of pawl-shaped elastic members 34, which are protruded diametrically inward and outward, such that their elastic members 34 are warped when set toward the damper mechanism 13. Two pairs of these elastic members 34 are arranged in each of the four ring portions 33. Each of the leaf spring portions 32 is further formed, at two sides across one pair of inward protruded elastic members 34, with guide pawls 35 which have a smaller extension than that of the elastic members 34 to apply a rotating force to the friction plate 31. Moreover, a friction member 36 is adhered to that side of the ring portion 33, which faces the inner face of the front cover 4 in the set position.

Figure 5:
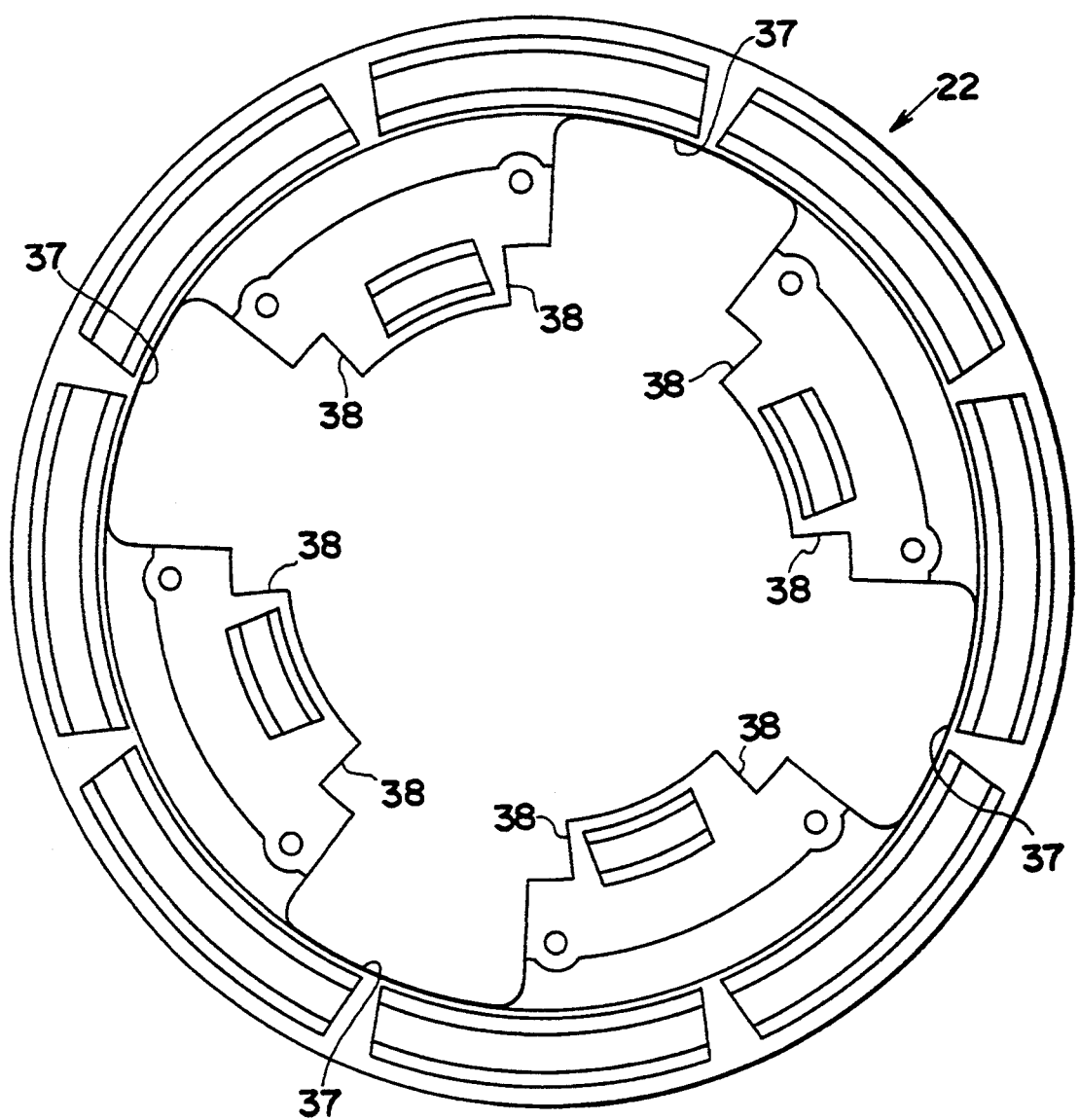
FIG. 5 is a front elevation showing a cover member.
Figure 6A:
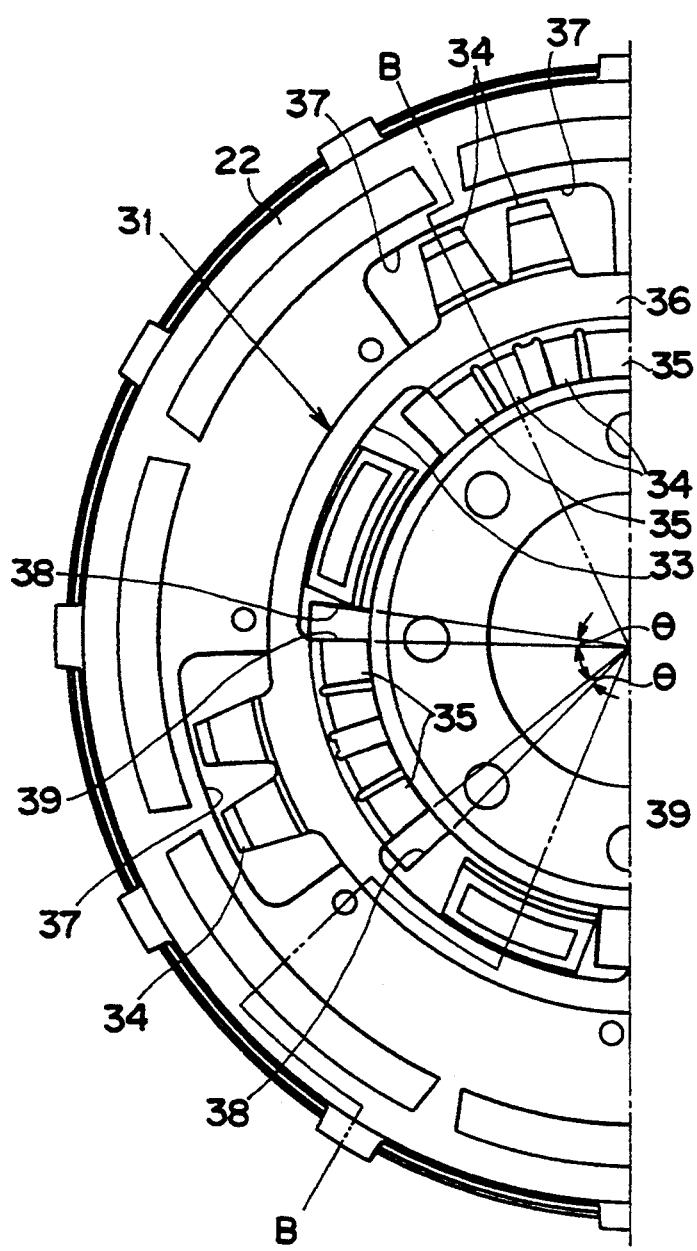
FIG. 6A is a front elevation showing a portion of the assembly of the friction plate.
Figure 6B:
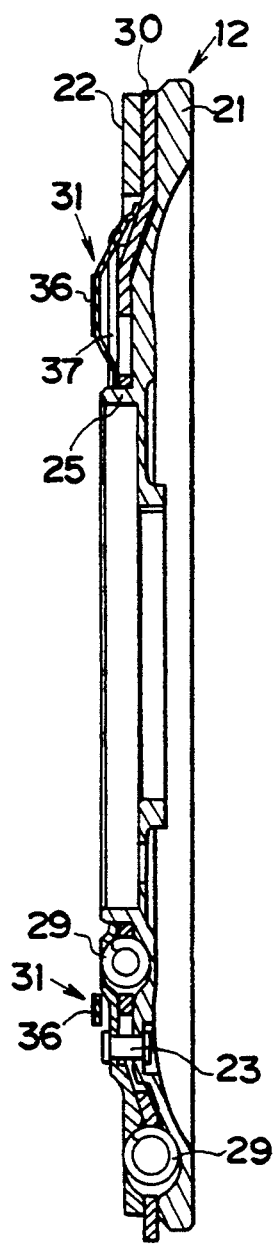
FIG. 6B is a section taken along line B—B of FIG. 6A.

The friction plate thus constructed is arranged, while having its leaf plate portions 32 deformed elastically, between the center plate 30 of the damper mechanism 13 and the inner face of the front cover 4. For this arrangement, the cover member 22, i.e., one member of the damper mass 12 is formed with four punched portions 37 for fitting the leaf spring portions 32 of the friction plate 31 therein. The punched portions 37 have their shape shown in FIG. 5 and their relative positions shown in FIG. 6 when the cover member 22 is assembled with the friction plate 31.

As shown in these Figures, each of the punched portions 37 is formed of a circumferentially narrower portion (having a smaller central angle) at the outer circumference and a circumferentially wider portion (having a larger central angle) at the inner circumference. The elastic members of the friction plate 31 at the outer circumference are so arranged inside of the narrower portions of the punched portions 37 that they contact with the side of the center plate 30. Moreover, the elastic members 34 and the guide pawls 35 at the wider portions of the punched portions 37, and the elastic members 34 contact with the side of the center plate 30. On the other hand, the guide members 35 are kept away from both the center plate 30 and the cover member 22. More specifically, the guide pawls 35 are positioned to face the edges 38 of the wider portions of the punched portions 37 generally in the circumferential direction, and the gaps between the edges 38 and the outer edges 39 of the guide plates 35 in the circumferential direction are set at a central angle $\theta$. As a result, if the damper mass 12 is rotated (or twisted) by the angle $\theta$ or more relative to the front cover 4 or the center plate 30, it comes into engagement with the friction plate 31 these two rotate together. On the contrary, if the damper mass 12 is then rotated (or twisted) by the angle $2\theta$ or more in the opposite direction, the damper mass 12 and the friction plate 31 likewise rotate together.

The friction plate 31 is arranged, while being elastically deformed in the axial direction, between the center plate 30 and the front cover 4, as described above, so that the friction member 36 adhered to the ring portion 33 of the friction plate 31 is in frictional contact with the inner face of the front cover 4.

The torque converter thus constructed is caused to transmit the torque by feeding a fluid flow established in the pump impeller 1, i.e., the helical flow of oil to rotate the turbine runner 6 so that the housing 5 is filled up therein with the oil. On the other hand, the lockup clutch 11 is engaged or released in accordance with the pressure difference in the portion at the two sides across the lockup piston 14. For this operation, the lockup clutch 11 is formed with an oil passage (as indicated at arrow A in FIG. 1) for feeding the oil pressure to the space at the side of the turbine runner 6 and an oil passage (as indicated at arrow B in FIG. 1) for feeding the oil pressure to the space between the lockup piston 14 and the damper mass 12.

As can be seen from the structure shown in FIG. 1, the oil pressure chamber 28 has its communication blocked from between the damper mass 12 and the lockup piston 14 but retained with the portion closer to the turbine runner 6 than the lockup piston 14, i.e., the portion to be fed with the oil pressure in the direction of arrow A, when the lockup piston 14 is moved leftward of FIG. 1 so that the lining member 15 comes into torque transmitting contact with the damper mass 12, i.e., the lockup clutch 11 is engaged. In other words, the oil pressure for engaging the lockup clutch 11 is also applied to the oil pressure chamber 28.

Next, the operation of the torque converter shown in FIG. 1 will be described in the following. FIG. 1 shows the lockup OFF state, i.e., the state, in which the lockup clutch 11 is released, and the lockup piston 14 is separated from the damper mass 12 by feeding the oil pressure in the direction of arrow B to raise the oil pressure between the lockup piston 14 and the damper mass 12. If the torque is applied in this state to the front cover 4 from the (not-shown) engine, the pump impeller 1 rotates together with the housing 5 to establish the helical flow of the oil. When this helical flow is applied to the turbine runner 6, this turbine runner 6 is rotated together with the hub 7 by the torque transmitted. This torque is transmitted to the automatic transmission through the (not-shown) input shaft fitted in the hub 7.

In case the lockup clutch 11 is to be engaged for the lockup ON, the oil pressure is fed in the direction of arrow A of FIG. 1 and is drained in the opposite direction of the arrow B. Thanks to the orifice effect at the narrow clearance between the aforementioned lining member 15 and the main member 21, the pressure in the space between the lockup piston 14 and the main member 21, but the pressure in the space at the back of the lockup piston 14, i.e., at the closer side to the turbine runner 6 than the lockup piston 14. As a result, the lockup piston 14 approaches the damper mass 12 to bring the lining member 15 into the torque transmitting contact with the side of the main member 21.

In this case, the pressure in the oil pressure chamber 28 is equalized to the pressure for pushing the lockup piston 14 onto the damper mass 12, because the oil pressure chamber 28 is sealed up liquid-tight by the seal ring 27 from the lower-pressure pressure between the damper mass 12 and the lockup piston 14 and communicates with the higher-pressure portion at the side of the turbine runner 6. Since, moreover, the radius $R_{12}$ of the sealing portion at the inner circumferential side for defining the oil pressure chamber 28 and the radius $R_{14}$ of the sealing portion at the inner circumferential side of the lockup piston 14 are equal, the force for pushing the lockup piston 14 leftward of FIG. 1 and the force for pushing the damper mass 12 rightward of FIG. 1 are balanced to hold the damper mass 12 in a position apart from the inner face of the front cover 4.

Thus, the input torque transmitted to the front cover 4 is transmitted to the damper mass 12 through the damper springs 29 in the damper mechanism 13 and further to the lockup piston 14 from that damper mass 12. In case the input torque fluctuates, the members including the damper mass 12 and the lockup piston 14 act as the inertial mass partly because the damper mass 12 is rotatable with respect to the housing 5 and partly because the lockup piston 14 is in torque transmitting contact with the damper mass 12. As a result, the damper springs 29 are compressed in response to the fluctuation of the input torque, to absorb the vibration. Thanks to the low sliding resistance between the damper mass 12 and the housing 5, moreover, it is possible to prevent the booming noise of the case in which the input r.p.m. is high.

Figure 7A:
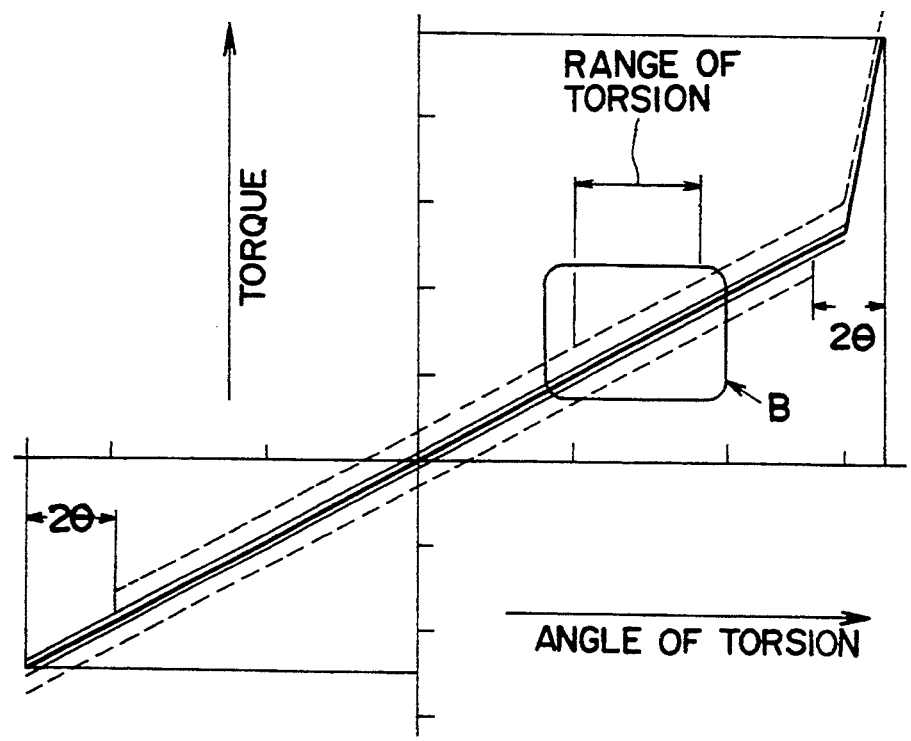
FIG. 7A is a diagram showing torsional characteristic curves.
Figure 7B:
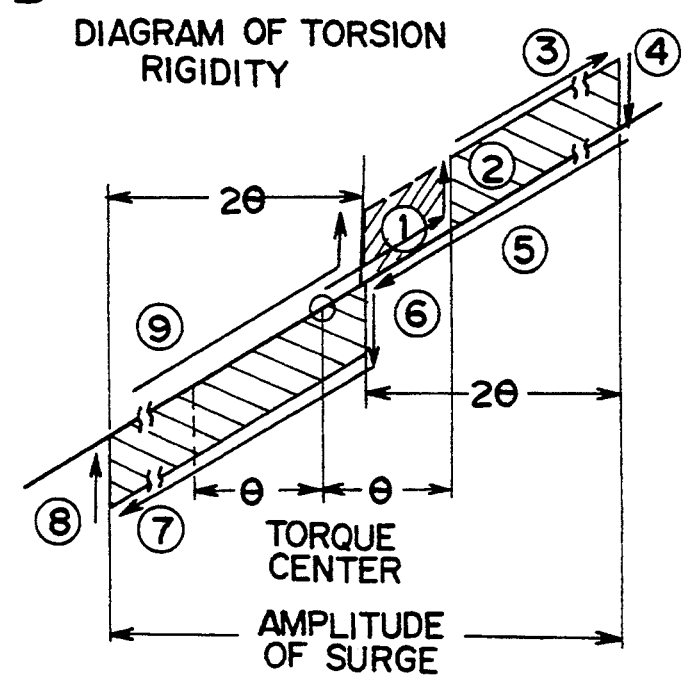
FIG. 7B is a diagram showing a torsional rigidity of a portion of the characteristic curves.

Furthermore, the construction of FIG. 1 prevents or suppresses the surging phenomenon by the action of its friction mechanism if the input torque highly fluctuates. In case the input torque rises with the lockup clutch 11 being engaged, as in case of a high acceleration to be effected by depressing the accelerator pedal highly from a cruising run, the angle of relative rotation (i.e., the torsion angle of the damper mechanism 13) between the center plate 30 or the drive side member and the damper mass 12 increases. This relation between the input torque and the torsion angle is plotted in a characteristic curve in FIG. 7. If the input torque abruptly fluctuates in the state of a predetermined torsion angle, the damper mechanism 13 has its torsion angle increased. When this angle grows equal to the central angle θ made between the edges 38 of the aforementioned punched portions 37 and the edges 39 of the guide pawls 35, these edges 38 and 39 come into contact with one another so that the damper mass 12 rotates relative to the center plate 30 and the front cover 4 while pushing the friction plate 31. This friction plate 31 is elastically deformed and sandwiched between the front cover 4 and the center plate 30, as described above, and is in contact with the front cover 4 through the friction member 36 so that the torque is transmitted by the frictional force established between the friction plate 31 and the front cover 4 as the plate 31 slides relative to the cover 4. This torque transmission is illustrated in the segment from point ① to points ② and ③ in the diagram torsional rigidity, as shown in FIG. 7B.

If a fluctuation starts in a direction to drop the input torque so that the elastic energy is released as the damper springs slacken, the damper mechanism 13 has its torsion angle reduced so that its damper mass 12 leaves the friction plate 31. As a result, the torque transmission between the members at the drive side and the damper mass 12 is executed only through the damper springs 29, as illustrated at points ④ and ⑤ in FIG. 7B.

When the torsion angle of the damper mechanism 13 increases in the opposite direction to the aforementioned one so that its reduced reaches from the beginning of reduction 2θ, the edges 38 at the opposite side of the punched portions 37 and the edges of the guide pawls 35 facing the former come into contact so that the friction plate 31 is rotated together with the damper mass 12 by the push of the damper mass 12. In this case, too, the torque transmission by the frictional force is effected between the front cover 4 and the damper mass 12. This torque transmission is illustrated in FIG. 7B along the segment containing points ⑥, ⑦ and ⑧, which is generally symmetric to the aforementioned segment containing points ②, ③ and ④. After this torsion in the negative direction has reached its limit, the forward torque transmission for feeding the torque from the drive side members is caused together with the torsion. When this torsion angle reaches the value 2θ, the friction plate 31 and the damper mass 12 come into engagement to rotate together so that a sliding resistance is established between the damper mass 12 and the front cover 4. This is illustrated at point ⑨ in FIG. 7B.

Thus, in the torque converter shown in FIG. 1, the sliding resistance is established between the drive side members and the output side members when the torsion angle in the damper mechanism 13 exceeds a predetermined value. As a result, in case of a high fluctuation of the input torque, both the power acting in the direction to compress the damper springs 29 and the power to be released from the damper springs 29 can be partially absorbed by the sliding friction of the friction plate 31 to suppress or prevent the surging phenomenon coming from the compression/extension of the damper springs 29.

Figure 8:
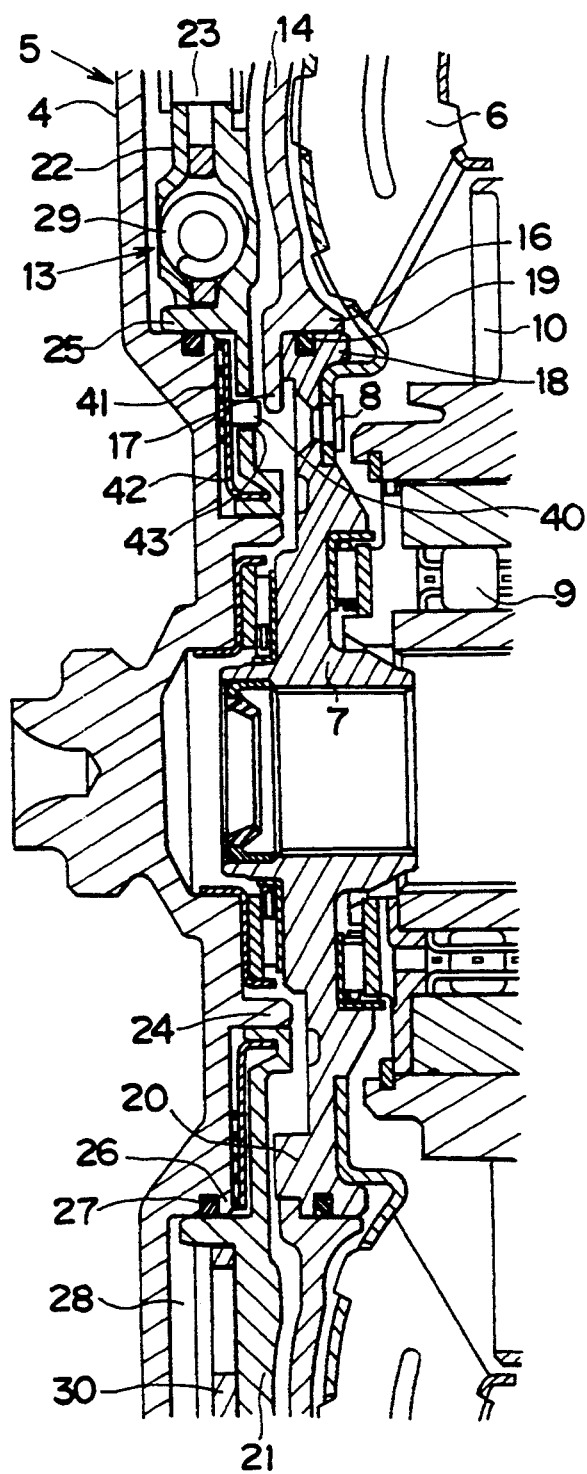
FIG. 8 is a section showing a portion of a second embodiment having another friction mechanism.

Next, another embodiment of the present invention will be described in the following with reference to FIG. 8 presenting a section showing a portion of the second embodiment of the present invention. In this embodiment, the aforementioned friction plate 31 is replaced by a friction disc 42 which is disposed in the main member 21 diametrically internally of the annular projection 25 and which is composed of engagement pins 40 and a friction member 41. The remaining construction left identical to that shown in FIG. 1.

Figure 9:
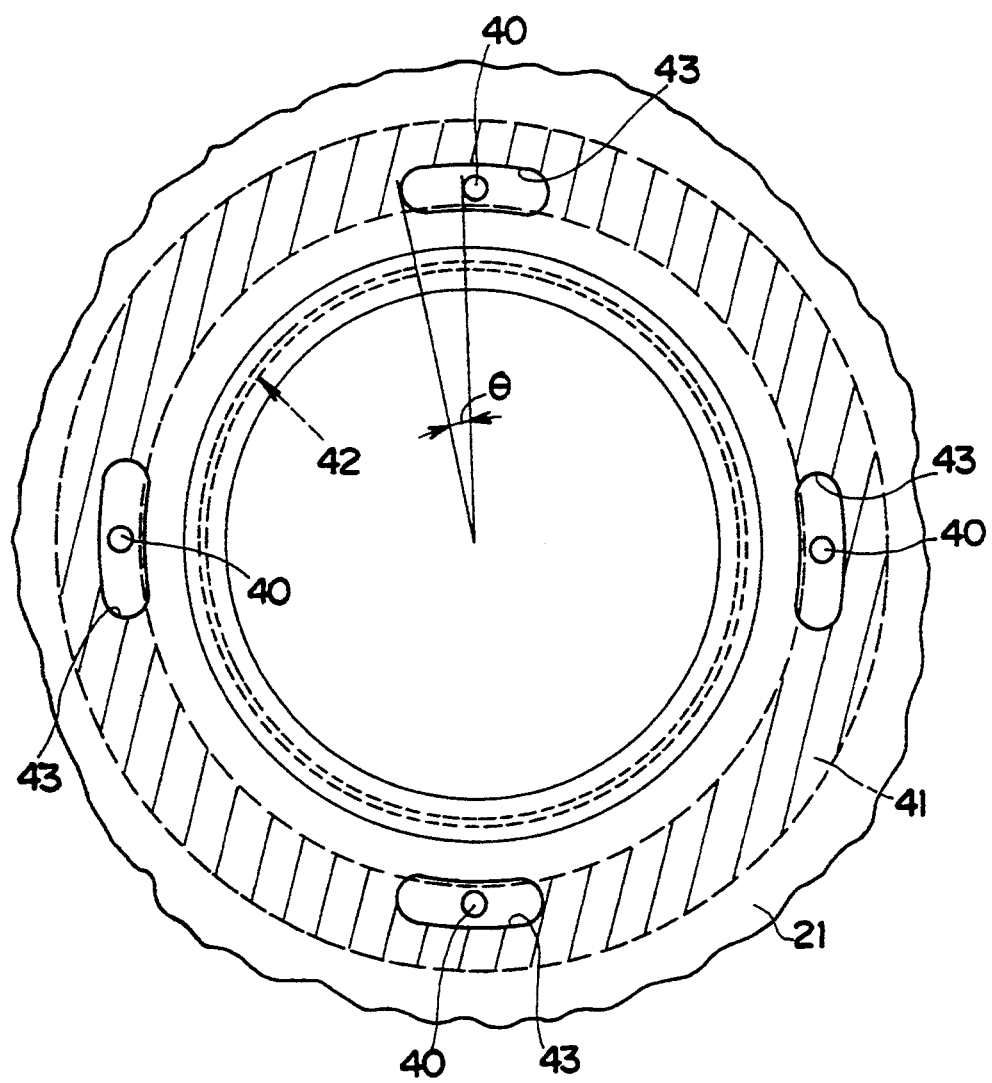
FIG. 9 is a front elevation showing a portion of the relative positions between the engagement pins and the slots of the second embodiment.

Specifically, the friction disc 42 is an annular member which has an external diameter smaller than the internal diameter of the annular projection 25 of the main member 21 and an internal diameter larger than the external diameter of the annular projection 24 of the front cover 4. The friction disc 42 is rotatably fitted in the main member 21 at its folded-back portion which is formed in the axial direction at its inner circumferential portion. Moreover, the friction member 41 is adhered to the side of the friction disc 42 at the side of the front cover 4, and the friction disc 42 is so sandwiched between the main member 21 and the front cover 4 as to push the friction member 41 to the inner face of the front cover 4. The engagement pins 40 are projected at four portions from the face of the friction disc 42, which is opposed to the face having the aforementioned friction member 41 adhered thereto. And, the main member 21 is formed with slots 43 for fitting the engagement pins 40 loosely therein. FIG. 9 shows the state in which the engagement pins 40 are fitted in the slots 43. As could be seen from FIG. 9, the slots 43 are formed into arcuately curved holes which has their length set to have the angle $2\theta$ for allowing relative rotation of the engagement pins 40.

Therefore, even in case the friction mechanism is constructed, as shown in FIGS. 8 and 9, the engagement pins 40 never fall to engage with the end portions of the corresponding slots 43 so that the friction disc 42 rotates together with the damper mass 12, if this damper mass 12 rotates by an angle more than $2\theta$ relative to the front cover 4. As a result, the sliding friction is caused between the front cover 4 and the friction disc 42. Thus, the frictional force against the large reciprocating rotation or twisting of the damper mass 12 relative to the front cover 4 can be intensified to suppress or prevent the surging phenomenon in case the input torque highly fluctuates.

Figure 10A:
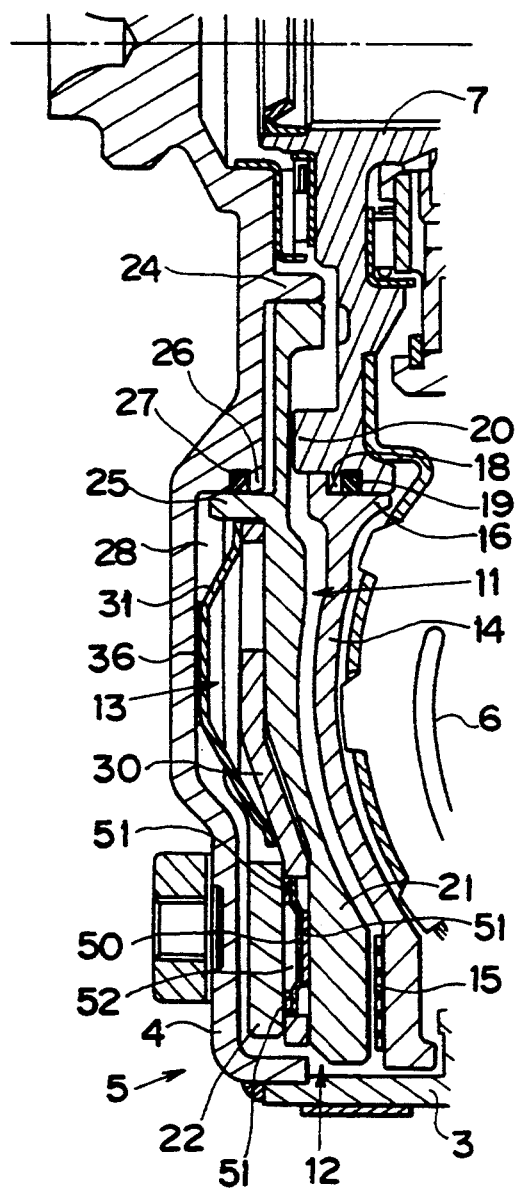
FIG. 10A is a section showing a portion of a third embodiment in which leaf springs are added to the friction mechanism.
Figure 10B:
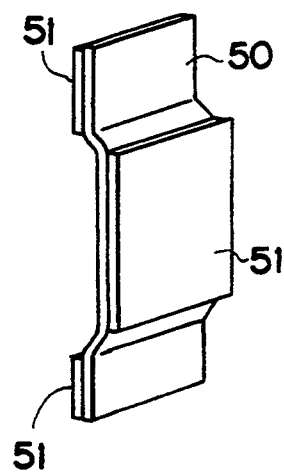
FIG. 10B is a schematic perspective view showing one example of the leaf spring.

FIG. 10 shows a further embodiment, in which leaf springs 50 are added to the construction shown in FIG. 1. These leaf springs 50 are formed into an elastic plate having an arcuate or bent section, as shown in FIG. 10B, and friction members 51 are adhered to three bulging portions of each leaf spring 50. On the other hand, the center plate 30 is formed in its outer circumference with through holes 52 which are circumferentially longer than the leaf springs 50. These leaf springs 50 are fitted in the through holes 52 and are deformed elastically in the thickness direction and sandwiched between the main member 21 and the cover member 22. As a result, the individual friction members 51 are pushed in contact with the main member 21 and the cover member 22. Moreover, the circumferential gaps between the leaf springs 50 and the through holes 52 fitting the leaf springs 50 are so set that the angle of allowing their relative rotation may take the value $2\theta$.

With the construction shown in FIG. 10, therefore, the leaf springs 50 are in the middle portions of the through holes while being held by the damper mass 12, unless the transmission state of the torque through the damper mechanism 13 drastically changes, that is, unless the input torque suddenly increases or decreases. If, on the other hand, the transmission state is abruptly changed with the sudden change in the input torque, the damper mass 12 highly rotates forward or backward relative to the center plate 30. If the angle of this relative rotation exceeds the value $\theta$ or $2\theta$, the leaf springs 50 are brought into abutment against the end portions of the through holes 52 so that they are regulated from any further movement to cause a slippage relative to the damper mass 12. With the friction mechanism shown in FIG. 10, therefore, the frictional forces by the friction plate 31 and the leaf springs 50 perform hysteresis actions so that the surging phenomenon can be prevented more effectively.

In the foregoing individual embodiments, the friction plate 31 is formed on its inner circumference with the elastic members 34, which are to contact with the side face of the center plate 30, and the guide pawls 35 which are kept away from contacting with both the center plate 30 and the cover member 22. Those guide pawls 35 may be constructed like the elastic members 34, as will be embodied in the following.

Figure 11:
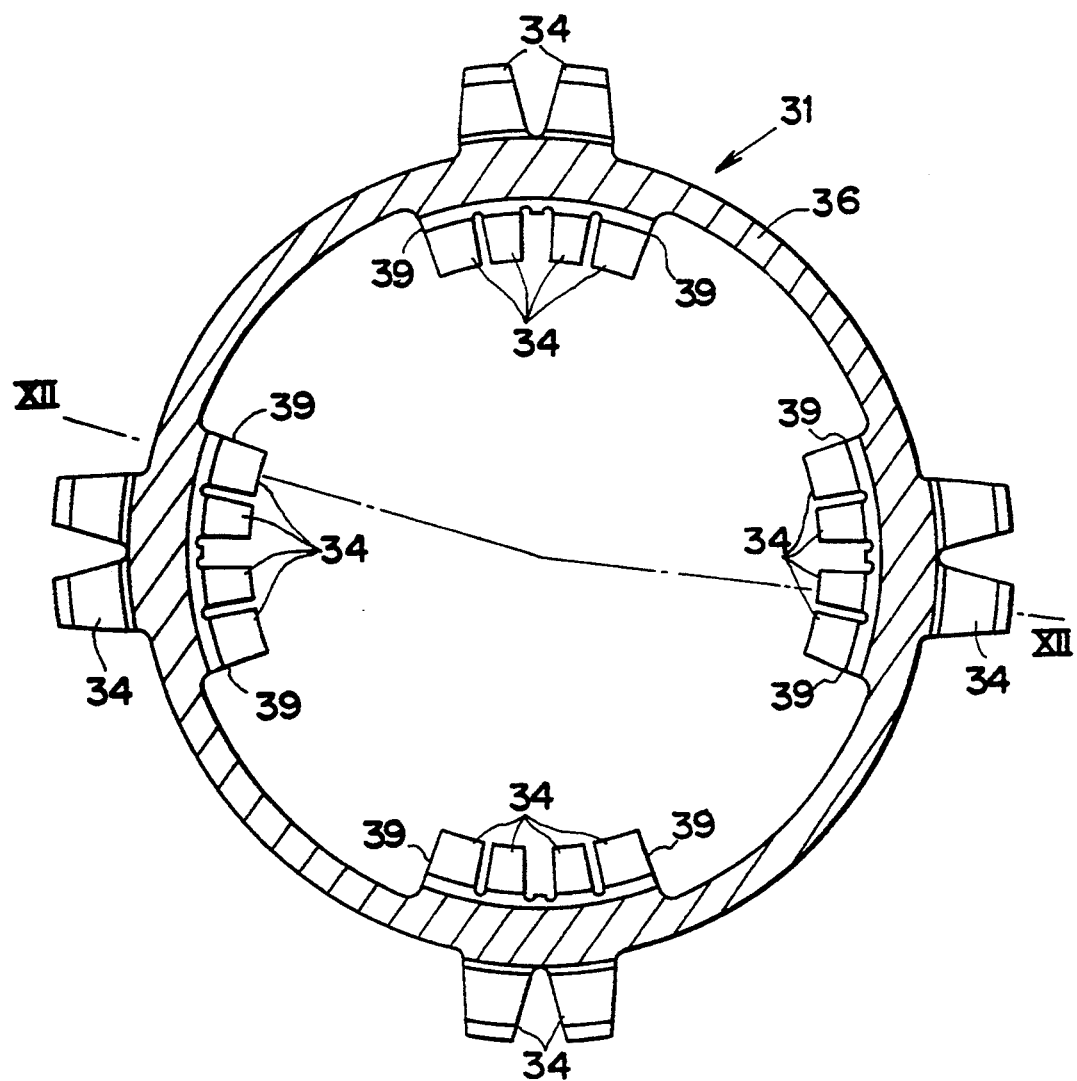
FIG. 11 is a front elevation showing another friction plate to be used in the present invention.
Figure 12:
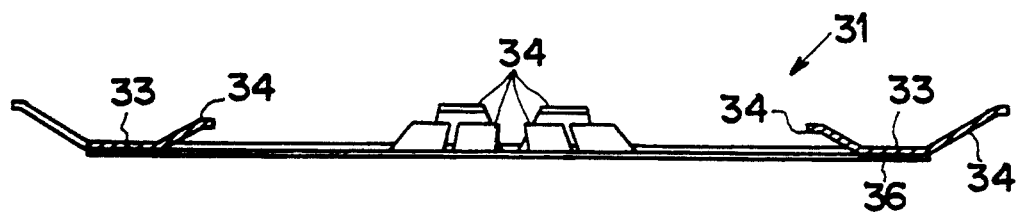
FIG. 12 is a section taken along line XII—XII of FIG. 11.

The friction plate 31 shown in FIG. 11 is formed at each of four portions of its inner circumference with four elastic members 34. These elastic members 34 are protruded in the same (upward of FIG. 12) direction as that of the elastic members 34 at the outer circumference.

Figure 13:
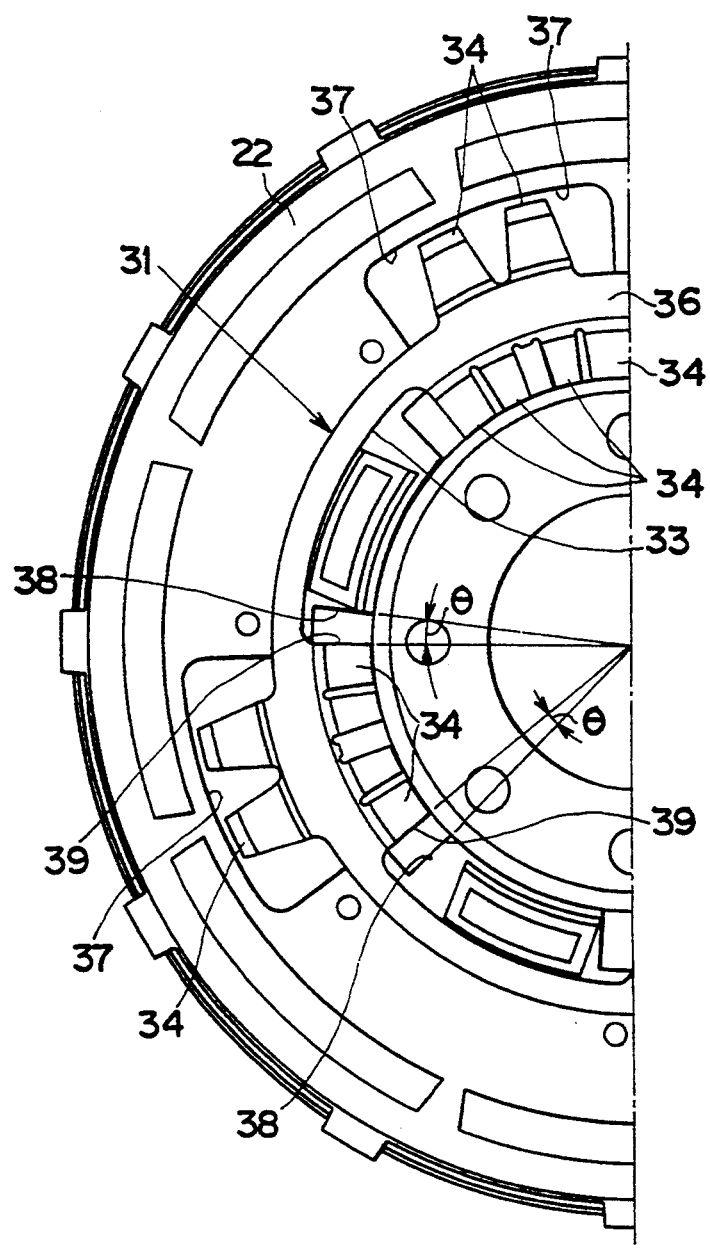
FIG. 13 is a front elevation showing a portion of the assembly of the friction plate shown in FIG. 11.

The assembly of the friction plate 31 shown in FIG. 1 is illustrated in FIG. 13. FIG. 13 presents the so-called neutral state, in which the gap between the edges 38 of the wider portions of the punched portions 37 and the edges 39 at the circumferential two ends of the elastic members 34 at the inner circumference is set to the central angle $\theta$. Thus, if the damper mass 12 is rotated (or twisted) by the angle $\theta$ or more relative to the front cover 4 or the center plate 30, the damper mass 12 comes into engagement with the friction plate 31 so that these two members rotate together. If the damper mass is then rotated (or twisted) by the angle $2\theta$ or more in the opposite direction, the damper mass 12 and the friction plates 31 likewise rotate together.

Moreover, the friction plate 31 is elastically deformed in the axial direction between the center plate 30 and the front cover 4, as described above, so that the friction member 36 adhered to the ring portion 33 is in frictional contact with the inner face of the front cover 4. In this case, both the inner elastic members 34 and the outer elastic members 34 of the friction plate 31 are in contact, while being elastically deformed, with the center plate 30 so that the ring portion 33 is exposed at its inner and outer circumferences to the elastic forces of those elastic members 34. As a result, the frictional member 36 adhered to the ring portion 33 contacts with the inner face of the front cover 4 substantially all over its surface so that it establishes a sufficient sliding frictional force if a relative slippage occurs.

This friction plate 31 shown in FIG. 11 also rotates relative to the front cover 4 so that it suppresses the surging phenomenon by the sliding frictional force. Moreover, since the friction plate 31 shown in FIG. 11 is held coaxially with the drive side members by the center plate 30, no radial slippage occurs between the friction plate 31 and the front cover 4. On the other hand, the ring portion 33 of the friction plate 31, i.e., the frictional member 36 adhered to the ring portion 33 is pushed to bring its whole face into contact with the front cover 4 by the elastic forces of the elastic members 34 at the inner circumference and the elastic members 34 at the outer circumference so that the frictional forces established are sufficient and uniform all over the surface. In other words, there never occurs the so-called offset contact or the accompanying frictional force reduction or offset wear.

Figure 14:
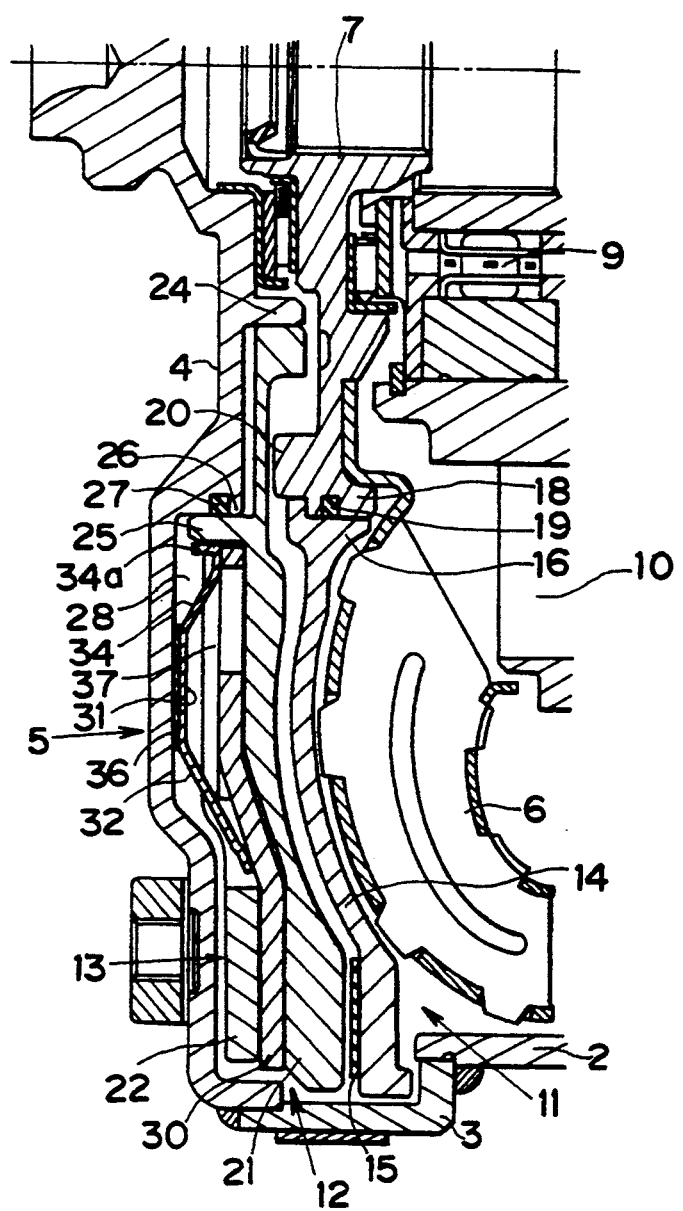
FIG. 14 is a section showing a portion of still another embodiment of the present invention.

A further embodiment of the present invention will be described in the following. In FIG. 14, the friction plate used in this torque converter is improved from the fiction plate 31 shown in FIG. 11, such that the elastic members 34 at the inner circumference have their leading end portions folded in the axial direction to form receiving portions 34a. Specifically, these receiving portions 34a are prepared by folding the leading end portions of the elastic members 34 in the direction to protrude toward the front cover 4 when the friction plate 31 is placed in position. In the assembled state, as shown in an enlarged scale in FIG. 15, each the receiving portions 34a is arranged to face the outer circumference of the annular projection 25 of the aforementioned main member 21. Between the outer circumference of the annular projection 25 and the receiving portions 34a, there may preferably be formed a small clearance to eliminate any sliding resistance between the two members.

Figure 15:
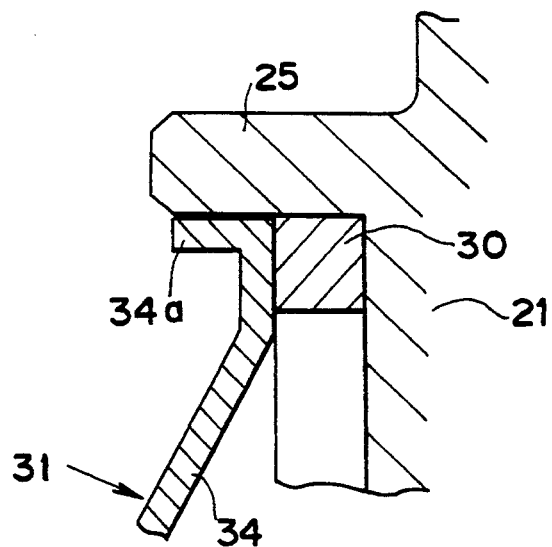
FIG. 15 is a section showing a portion of the shape of the leading end portion of an inner elastic member of the embodiment shown in FIG. 14.

In the embodiment shown in FIGS. 14 and 15, too, if a load acts to clamp the friction plate 31, its elastic members 34 at the inner and outer circumferences are elastically deformed to intensify the loads acting upon their leading end portions. If, however, the deflections of the elastic members 34 at the inner circumference increase to some extent, the receiving portions 34a formed at their leading end portions come into contact with the outer circumference of the annular projection 25. As a result, the area of the inner elastic members 34 for receiving the load is enlarged to reduce its facial pressure so that the durability can be improved while the wear being prevented from advancing. Moreover, since the contact area with the cover member 22 in the rotational direction is increased, the facial pressure can be reduced by the rotational force. Incidentally, the receiving portions may be formed to have a shape shown in FIG. 16. In this embodiment, as shown, the leading end portions of the elastic members 34 at the inner circumference are folded in the axial direction, and the bent leading end portions along the axial direction are further folded radially inward to form the receiving portions 34a. With this construction, the area for receiving the load can be further enlarged, and the thrust load can also be borne by those receiving portions 34a.

Figure 16:
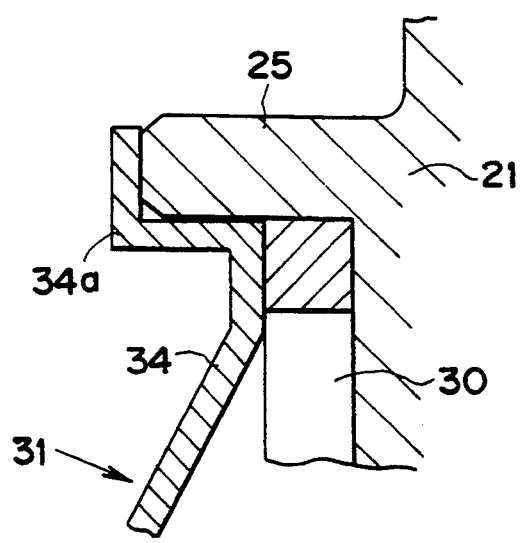
FIG. 16 is a section showing a portion of another shape of the leading end portion of the inner elastic member.

In the embodiment shown in FIGS. 14 and 15 and in the embodiment shown in FIG. 16, the friction plate 31 is centered by the main member 21 if the receiving portions 34a of the inner elastic members 34 come into contact with the outer circumference of the annular projection 25 of the main member 21. Since the main member 21 is held coaxially with the front cover 4, the friction plate 31 is also positioned coaxially with the front cover 4 through the main member 21. Thus, since no radial sliding motion occurs between the friction plate 31 and the front cover 4, it is possible to prevent any excessive slippage and any according reduction of the durability.

Figure 17:
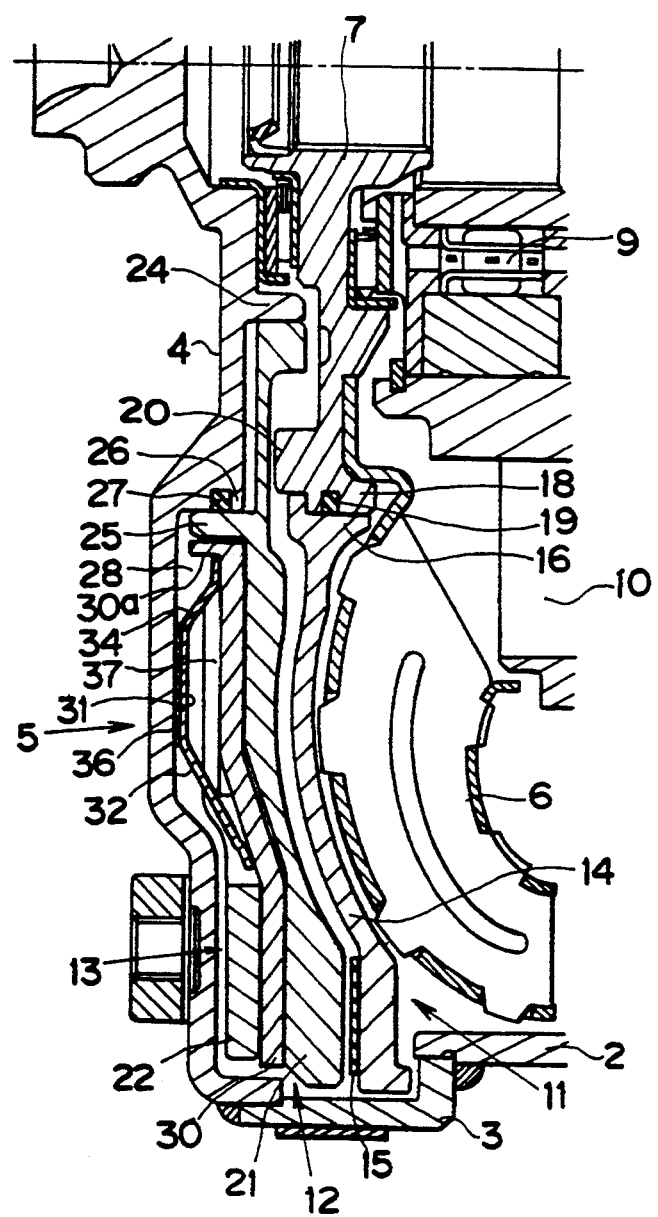
FIG. 17 is a section showing a portion of a further embodiment of the present invention.

As described above, the friction plate 31 establishes the resisting force resulting from the sliding friction between the damper mass 12 and the front cover 4, in case the angle of the relative rotation between the damper mass and the drive side members such as the front cover 4, i.e., the torsion angle of the damper mass 12 exceeds a predetermined value. As a result, if any of the elastic members 34 is always in contact with the output side members such as the damper mass 12, the torque is transmitted, although slightly, by the sliding friction at the contacting portions. Since this torque transmission may cause the booming noise, another embodiment shown in FIG. 17 is constructed such that the friction plate 31 is supported exclusively by the center plate 30 or one of the drive side members.

Specifically, those portions of the inner circumference of the center plate 30, which are located to correspond to the inner elastic members 34 of the friction plate 31, are formed with projections 30a which are protrude toward the front cover 4. The friction plate 31 is held coaxially with the center plate 30 by having its inner elastic members 34 abutting at their leading end portions against the projections 30a from their radially outer sides. Incidentally, a small clearance is set between the projections 30a and the annular projection 25 of the main member 21. As a result, the friction plate 31 can prevent the booming noise, because it has no contact with the damper mass 12 while the torsion angle of the damper mechanism 13 is smaller than the predetermined value.

Even in case the friction plate 31 is held exclusively by the center plate 30 as in the embodiment shown in FIG. 17, the shapes of the leading ends of its inner elastic members 34 can be modified in various manners, if necessary, as will be embodied in the following several manners.

Figure 19:
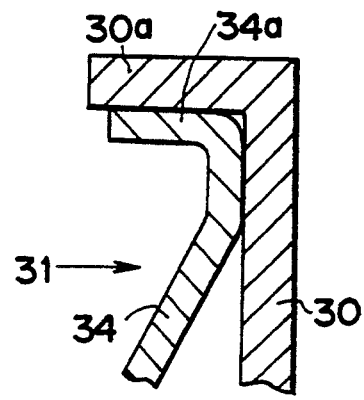
FIG. 19 is a section showing a portion of another example of the leading end shape of the inner elastic member to be adopted in the embodiment shown in FIG. 17.

In the embodiment shown in FIG. 19, each of the inner elastic members 34 of the friction plate 31 is folded at its leading end portion toward the front cover 4 along the corresponding projection 30a of the center plate 30, to form the receiving portion 34a. With this construction, the contact area of the inner elastic members 34 with the center plate 30 is enlarged to drop the facial pressure so that the progress of the wear can be suppressed.

Figure 20:
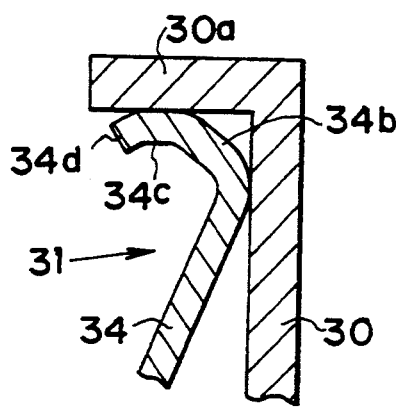
FIG. 20 is a section showing a portion of still another example of the leading end shape of the inner elastic member to be adopted in the embodiment shown in FIG. 17.

In the embodiment shown in FIG. 20, the leading end portion of one inner elastic member 34 is sequentially folded at its three portions to form a first inclined portion 34b sloped toward the center, a flat portion 34c extending along the axial direction, and a second inclined portion 34d sloped toward the outer circumference. With this construction, not only the facial pressure of the contacting portion between the inner elastic member 34 and the center plate 30 is reduced, but also the first inclined portion 34b performs a spring action. As a result, the flat portion 34c and the projection 30a can be held in close contact by substantially equalizing the size of the flat portion 34c from the center of rotation to the size of the outer circumference of the projection 30a from the center of rotation. Moreover, the size of the flat portion 34c from the center of rotation can be easily controlled.

Figure 21:
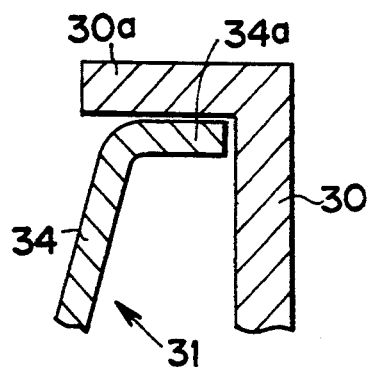
FIG. 21 is a section showing a portion of a further example of the leading end shape of the inner elastic member to be adopted in the embodiment shown in FIG. 17.

In the embodiment shown in FIG. 21, the inner elastic member 34 is folded at its leading end portion in the opposite direction to that of the embodiment of FIG. 19, to form the receiving portion 34a.

Figure 22:
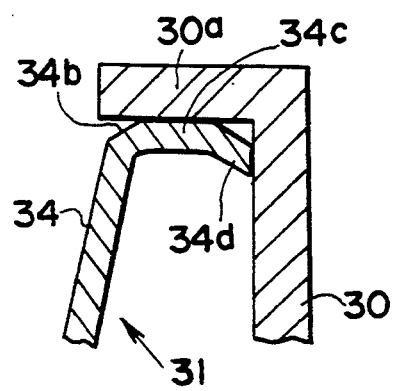
FIG. 22 is a section showing a portion of a further example of the leading end shape of the inner elastic member to be adopted in the embodiment shown in FIG. 17.

In the embodiment shown in FIG. 22, the inner elastic member 34 is folded at its leading end portion in the opposite direction to that of the embodiment shown in FIG. 20, to form the first inclined portion 34b, the flat portion 34c and the second inclined portion 34d.

Figure 18:
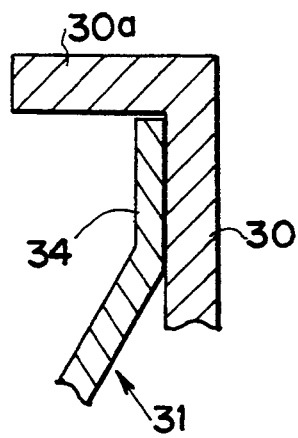
FIG. 18 is a section showing a portion of the inner circumference of the center plate in the embodiment shown in FIG. 17.
Figure 23:
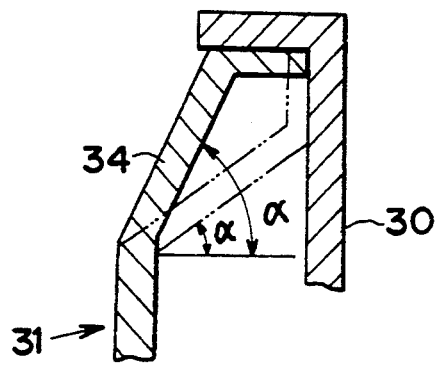
FIG. 23 is a diagram for explaining the angle between the inner elastic member and a ring portion.

In either of these embodiments shown in FIGS. 21 and 22, it is possible to achieve effects similar to those of the corresponding embodiment shown in FIG. 19 or 20. In the embodiments shown in FIGS. 21 and 22, moreover, the angle of inclination $\alpha$ (as seen from FIG. 23) of the inner elastic member 34 with respect to the ring portion 33 is larger than those of the individual embodiments shown in FIGS. 18 to 20, so that the spring constant of the inner elastic member 34 can be reduced.

In any of the embodiments shown in FIGS. 17 to 22, furthermore, the friction plate 31, which may rotate relative to the front cover 4, can be held coaxially with the drive side members including the front cover 4.

In the aforementioned individual embodiments, at the assembling time of the torque converter, the friction plate 31 is elastically deformed to push the friction member 36 onto the inner face of the front cover 4. In the following embodiments, on the other hand, the damper mechanism 13 is made movable in the axial direction so that it is moved by the oil pressure to warp the friction plate 31.

Figure 24:
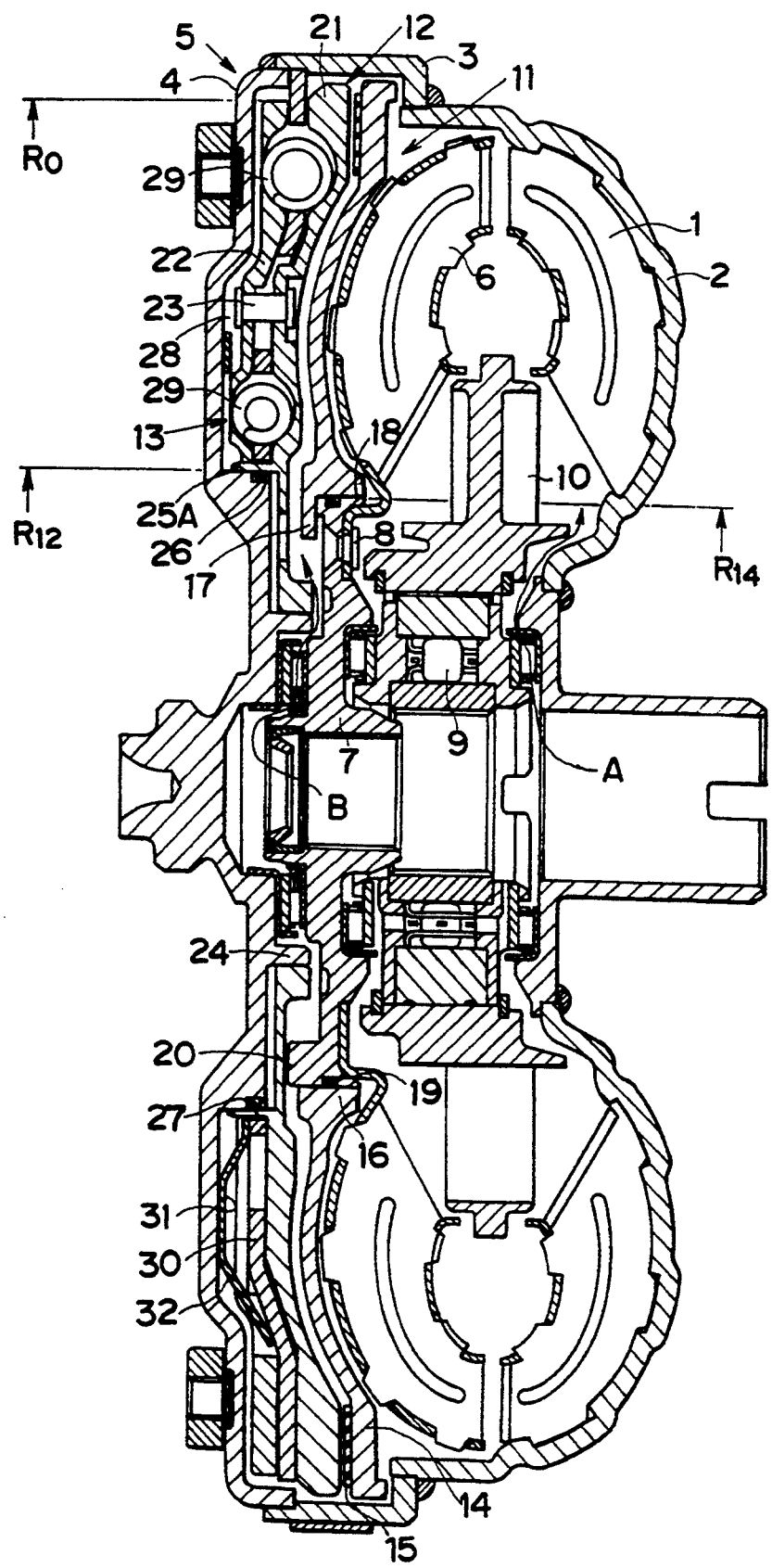
FIG. 24 is a section showing an embodiment in which the damper mechanism can be hydraulically moved.
Figure 25:
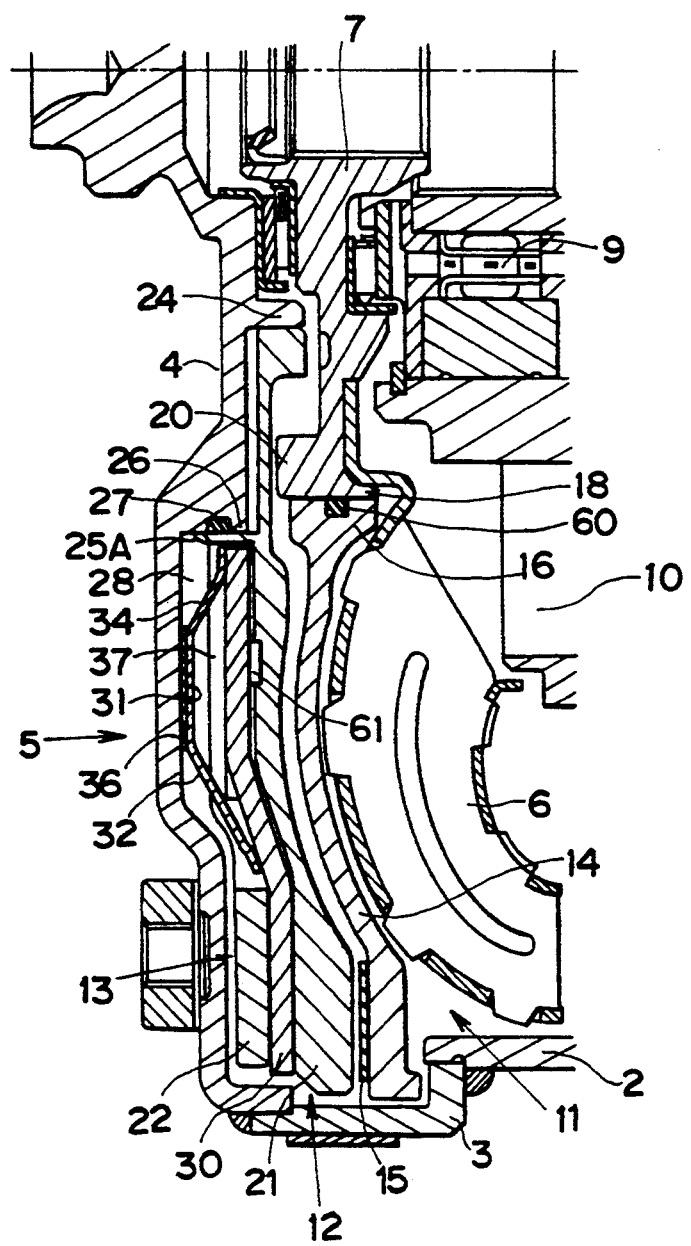
FIG. 25 is a section showing a portion showing an improvement over the embodiment shown in FIG. 24.

In the torque converters shown in FIGS. 24 and 25, more specifically, the main member 21 is formed with an annular projection 25A which is formed toward the inner face of the front cover 4 to have an internal diameter larger than that of the cylindrical portion 16 of the aforementioned lockup piston 14. The annular projection 25A is rotatably fitted in the cylindrical portion 26 which is projected from the inner face of the front cover 4. The space between the annular projection 25A and the cylindrical portion 26 is sealed liquid-tight by the seal ring 27 which is fitted in the cylindrical portion 26. In other words, the seal portion at the inner circumference of the damper mass 12 is given a larger diameter $R_{12}$ than the radius $R_{14}$ of the seal portion of the inner circumference of the lockup piston 14. Moreover, the oil pressure chamber 28 is formed between the inner face of the front cover 4 and the damper mass 12 by sealing the space between the front cover 4 and the damper mass 12 liquid-tight by the seal ring 27.

In these torque converters, on the other hand, the damper mechanism 13 composed of the damper mass 12, the damper springs 29 and the center plate 30 is made slightly movable in the axial direction. The remaining construction is identical to that of the torque converter shown in FIG. 1.

In the torque converters shown in FIGS. 24 and 25, therefore, if the oil pressure is fed in the direction of arrow A to engage the lockup clutch 11, the load for pushing the lockup piston 14 leftward of FIG. 1 exceeds the load for pushing the damper mass 12 rightward of FIG. 1. This is because the radius $R_{12}$ of the inner seal portion defining the oil pressure chamber 28 is larger than the radius $R_{14}$ of the inner seal portion of the lockup piston 14.

Specifically, a force $F_{14}$ for pushing the lockup piston 14 leftward of FIG. 1 is expressed by the following formula, if the oil pressure for engaging the lockup clutch 11 is designated at Pa whereas the oil pressure between the lockup piston 14 and the damper mechanism 13 is designated at Pb and if the radius of the seal portion for separating the portions to be exerted by those oil pressures is designated at Ro:

$$F14 = \pi \times (Ro^2 - R_{14}^2) \times (Pa - Pb).$$

On the other hand, a force $F13$ for pushing the damper mechanism 13 rightward of FIG. 1 is expressed by the following Formula:

$$F13 = \pi \times (Ro^2 - R_{12}^2) \times (Pa - Pb).$$

Here, $R_{14} < R_{12}$, and the pressure receiving area of the lockup piston 14 is wider than that of the damper mechanism 13. As a result, the damper mechanism 13 is pushed leftward of FIG. 1 by the following difference F between the above expressed forces:

$$F = F14 - F13 = \pi \times (R_{12}^2 - R_{14}^2) \times (Pa - Pb).$$

As a result, the friction plate 31 arranged between the center plate 30 and the front cover 4 is pushed onto the front cover 4 by the above expressed force F.

In these torque converters shown in FIGS. 24 and 25, too, the friction plate 31 is pushed to rotate relative to the front cover 4 by the pushing action of the damper mass 12, if a relative rotation exceeding a predetermined angle is caused between the damper mass 12 and the front cover 4 by the fluctuation of the input torque. In this case, the friction plate 31 is pushed onto the front cover 4 by the force which is based upon the oil pressure for engaging the lockup clutch 11, as described above, so that it slides relative to the front cover 4 to transmit the torque by the frictional force between them. In short, a resisting force is established in the direction to suppress the torsion of the damper mechanism 13.

Thus, the force for pushing the friction plate 31 onto the front cover 4 is determined by both the oil pressure for engaging the lockup clutch 11 and the difference in the pressure receiving area between the lockup clutch 11 and the damper mechanism 13. According to the constructions shown in FIGS. 24 and 25, the load for pushing the friction member 36 onto the front cover 4 is stabilized at the designed value to stabilize the surging preventing effect and to facilitate the size control of the friction plate 31 or the like.

Incidentally, the present invention should not be limited to the embodiments thus far described but can be modified, as shown in FIG. 25. For example, the seal ring 19 for sealing up the hub 7 and the lockup clutch 14 need not be attached to the outer circumference of the hub 7 but may be replaced by an O-ring 60 which is fitted in the inner circumference of the lockup clutch 14. By this modification, the attachment of the sealing member can be facilitated.

Moreover, the lining member 15 for establishing the frictional force to transmit the torque between the lockup piston 14 and the damper mass 12 need not be attached to the lockup piston 14 but may be attached to the damper mass 12, as shown in FIG. 25. By this modification, the inertial force of the output side members such as the turbine runner 6 is so weakened as to take an advantage in reducing the shifting shock. The inertial force of the drive side members such as the damper mechanism 13 is so intensified as to take an advantage in reducing the idle r.p.m. to improve the fuel economy.

In the construction shown in FIG. 1, the force for pushing the friction plate 31 onto the front cover 4 acts upon the friction plate 31 through the main member 21 and the center plate 30 in the damper mechanism 13 so that the load acts in the direction to cause the contact between the main member 21 and the center plate 30. If the main member 21 and the center plate 30 are forced to contact over a wide area by that load, the hysteresis of the damper mechanism 13 in the state of a small input torque fluctuation is increased to take a disadvantage in reducing the booming noise. In case, therefore, the friction between the main member 21 and the center plate 30 needs to be minimized, a bearing 61 may be interposed between the main member 21 and the center plate 30, as shown in FIG. 25.

The guide pawls 35 in the embodiment shown in FIGS. 1 to 7 can be given a function to position the friction plate 31, as will be embodied in the following.

Figure 26:
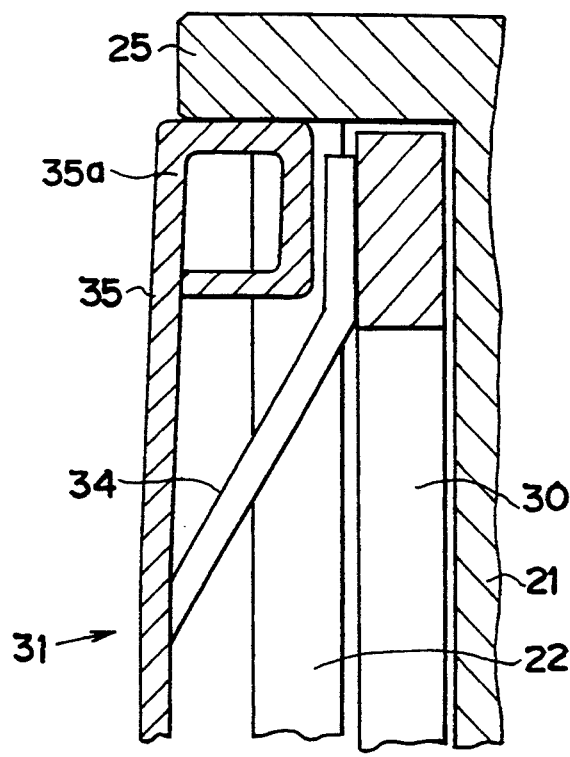
FIG. 26 is a section showing a portion of a further example of the friction plate.

FIG. 26 shows one of the guide pawls 35. As shown, the guide pawl 35 is formed at its leading end portion with a fitting portion 35a which is shaped by folding the leading end portion of a slender projection extending radially inward from the ring portion 33, into a hollow portion having a square section. Of the outer faces of the fitting portion 35a, the axial flat face of the radially innermost portion is given a radial size equal to the external radius of the annular projection 25 in the aforementioned main member 21 so that the friction plate 31 is positioned coaxially with the damper mass 12 while being fitted in the annular projection 25 of the main member 21 by the guide member 35.

Figure 27:
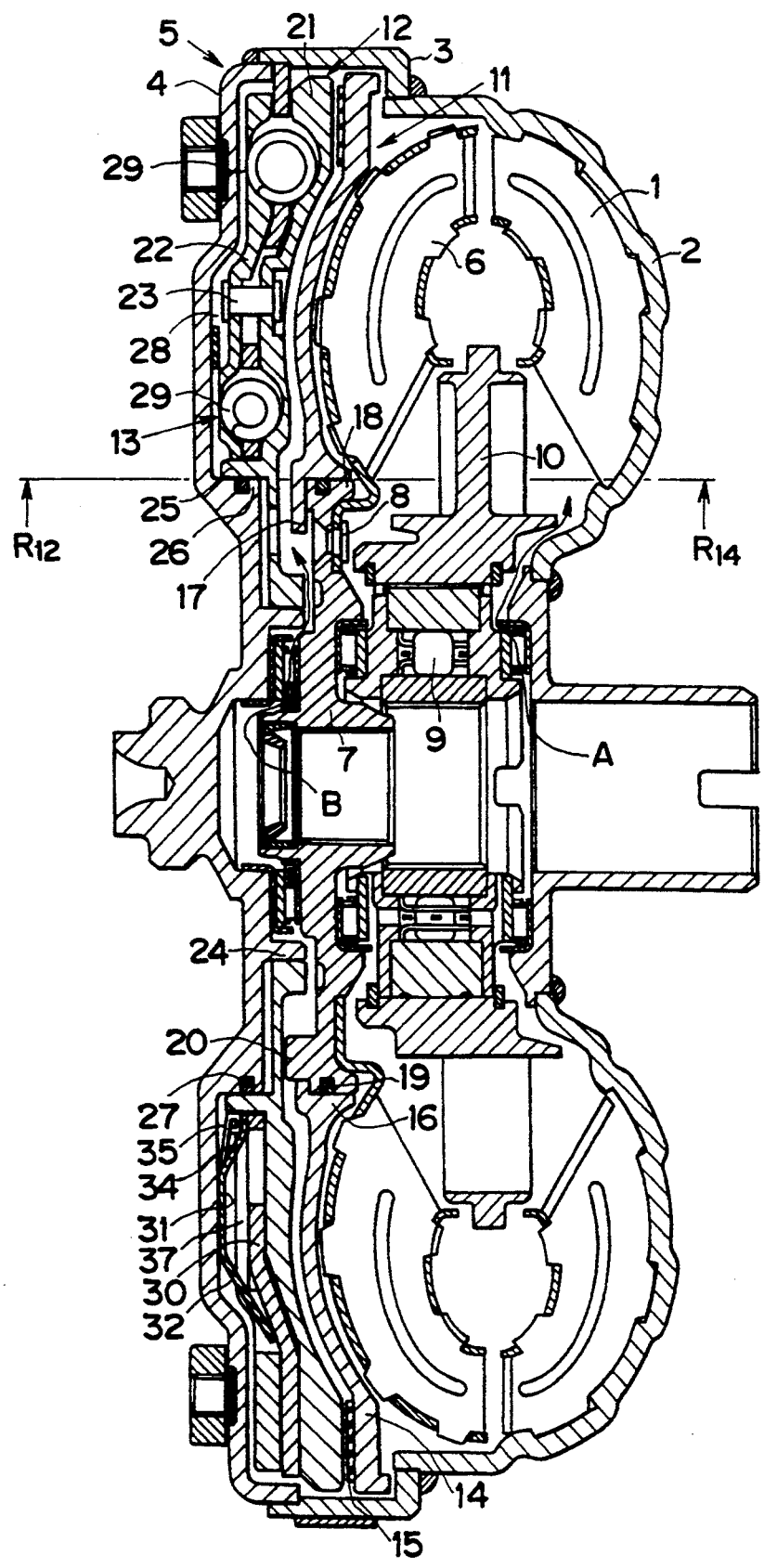
FIG. 27 is a section showing a torque converter into which the friction plate shown in FIG. 26 is incorporated.

In FIG. 27, there is shown a torque converter using the friction plate 31 which is formed the aforementioned fitting portions 35a at the guide pawls 35. The guide pawls 35 of the friction plate 31 assembled, as shown in FIG. 27, are positioned inside of the punched portions 37 of the cover member 22. Moreover, the edges 38 of the wider punched portions 37 and the edges 39 of the two circumferential ends of the fitting members 35 face each other in the circumferential direction. These edges 38 and 39 come into engagement when the torsion angle of the damper mechanism 13 exceeds the predetermined angle. In short, the engagement mechanism is formed by constructing the punched portions 37 with respect to the edges 39 of the guide pawls 35, as described above.

The friction plate 31 is assembled while having its elastic members 34 being pushed in the axial direction and elastically deformed, as shown in FIG. 27, and is supported by fitting the fitting portions 35a of the guide pawls 35 on the annular projection 25 of the main member 21. Since the elastic members may go out of contact with the annular projection 25, the interference between the leading end portions of the elastic members 34 and the annular projection 25 can be easily avoided by making the radial size of the leading end portions of the elastic members 34 far larger than the external radius of the annular projection 25 of the main member 21. Moreover, the elastic members 34 can be easily manufactured and machined because any special accuracy is required of their radial size.

In the torque converter shown in FIG. 27, too, the friction plate 31 is pushed by the damper mass 12 to rotate together with the input side members such as the front cover 4, when the torsion angle of the damper mechanism 13 increases with a large fluctuation of the input torque. The engagement of the friction plate 31 and the damper mass 12 at this time is effected by the abutment between the edges 38 of the punched portions 37 in the cover member 22 and the edges 39 of the guide pawls 35. Since the fitting portions 35a at the leading ends of the guide pawls 35 are formed by folding the projections of the ring portion 33 into the square hollow shape, as shown in FIG. 26, their area to contact with the edges 38 of the punched portions 37 is enlarged. As a result, those edges 38 and 39 can have their facial pressure reduced to improve the durability while preventing their wear or breakage.

Incidentally, the friction plate 31 acts, if the torsion angle of the damper mechanism 13 is large, that is, if the fluctuation of the input torque is high, to establish the sliding friction between the input side members and the output side members for the damper springs 29. In case, therefore, the fluctuation of the input torque is lower, the sliding friction by the friction plate 31 is preferably as low as possible. In an embodiment shown in FIG. 28, this preference is embodied by supporting the friction plate 31 by a drive side member such as the center plate 30.

Of the inner circumference of the center plate 30, the portions corresponding to the guide pawls of the friction plate 31 are formed with the projections 30a directed toward the front cover 4. On the other hand, the leading end portions of the guide pawls 35 are folded generally at right angles in the opposite direction to the projections 30a, to form fitting portions 35b. Moreover, the friction plate 31 is coaxially in the center plate 30 with its fitting portions 35b being in close contact with the faces of the projections 30a at the outer circumference. As a result, in the construction shown in FIG. 28, the friction plate 31 does not come into contact with any follower member before the torsion angle of the damper mechanism 13 exceeds the predetermined value. Thus, the transmission of the vibration from the drive members to the driven members can be prevented while the fluctuation of the input torque is low, to reduce the booming noise furthermore.

Figure 28:
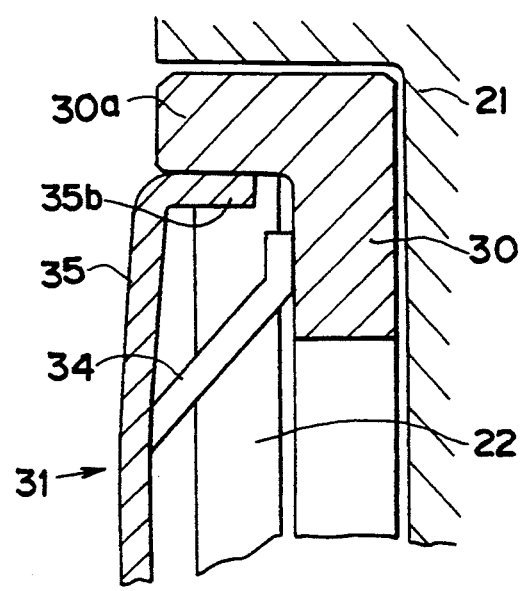
FIG. 28 is a section showing a portion of a further shape of the fitting portion of the friction plate.

In the construction shown in FIG. 28, too, the elastic members 34 for establishing the elastic force in the axial direction and the fitting portions 35b for the so-called centering action are provided independently of one another. As a result, the friction plate 31 can be accurately held coaxially with the drive side members to ensure the stable effect of preventing the surging phenomenon.

Figure 29:
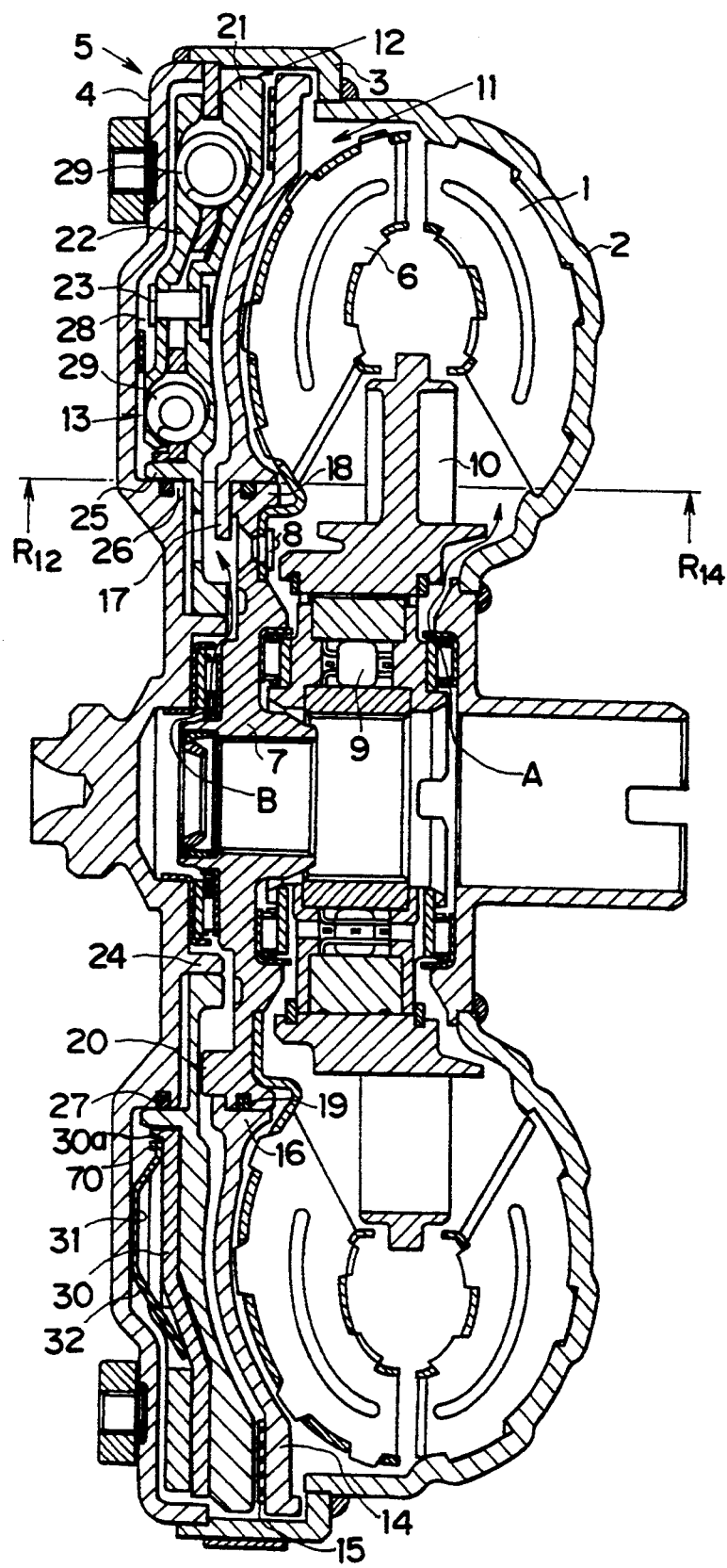
FIG. 29 is a section showing a further embodiment of the present invention.
Figure 30:
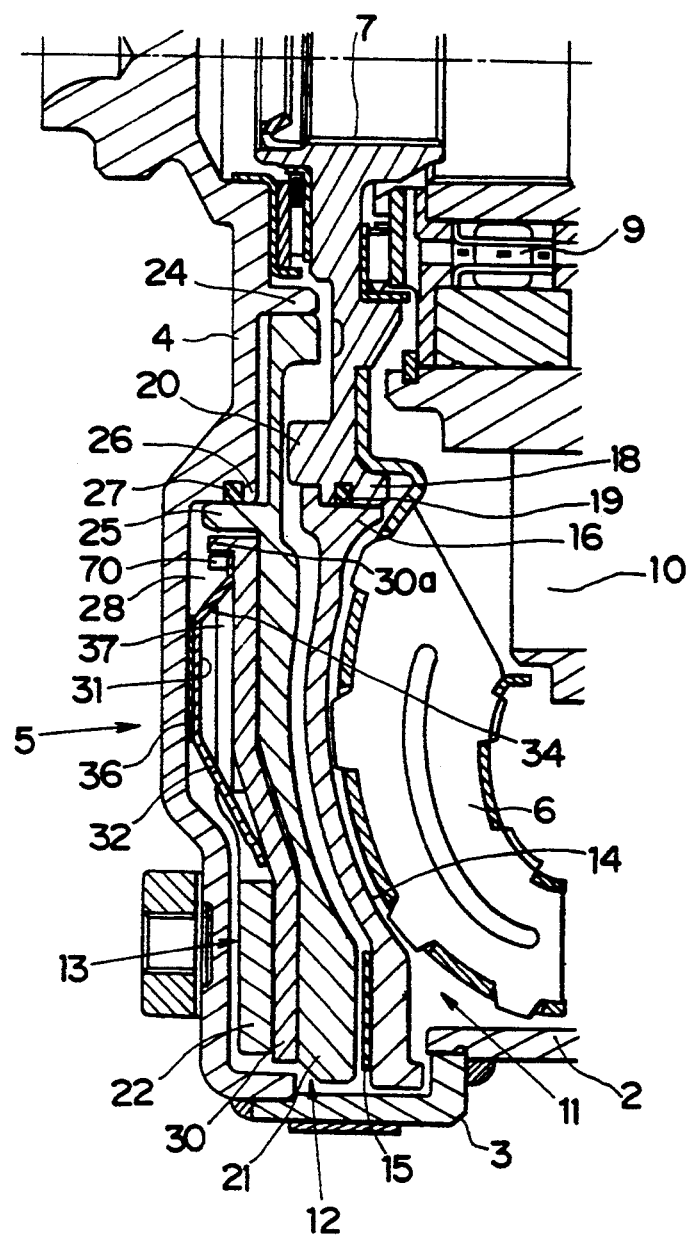
FIG. 30 is a section showing a portion of the arrangement of the friction plate in the embodiment shown in FIG. 29.

Here will be described other embodiments which are constructed to damp the shock at the time when the aforementioned friction plate 31 begins its action. FIG. 29 is a section showing one of the embodiment. The torque converter, as shown, is an improvement over the foregoing one shown in FIG. 17. Specifically, the center plate 30 is formed at its inner circumference with the arcuate projections 30a which are projected toward the front cover 4.

Figure 31:
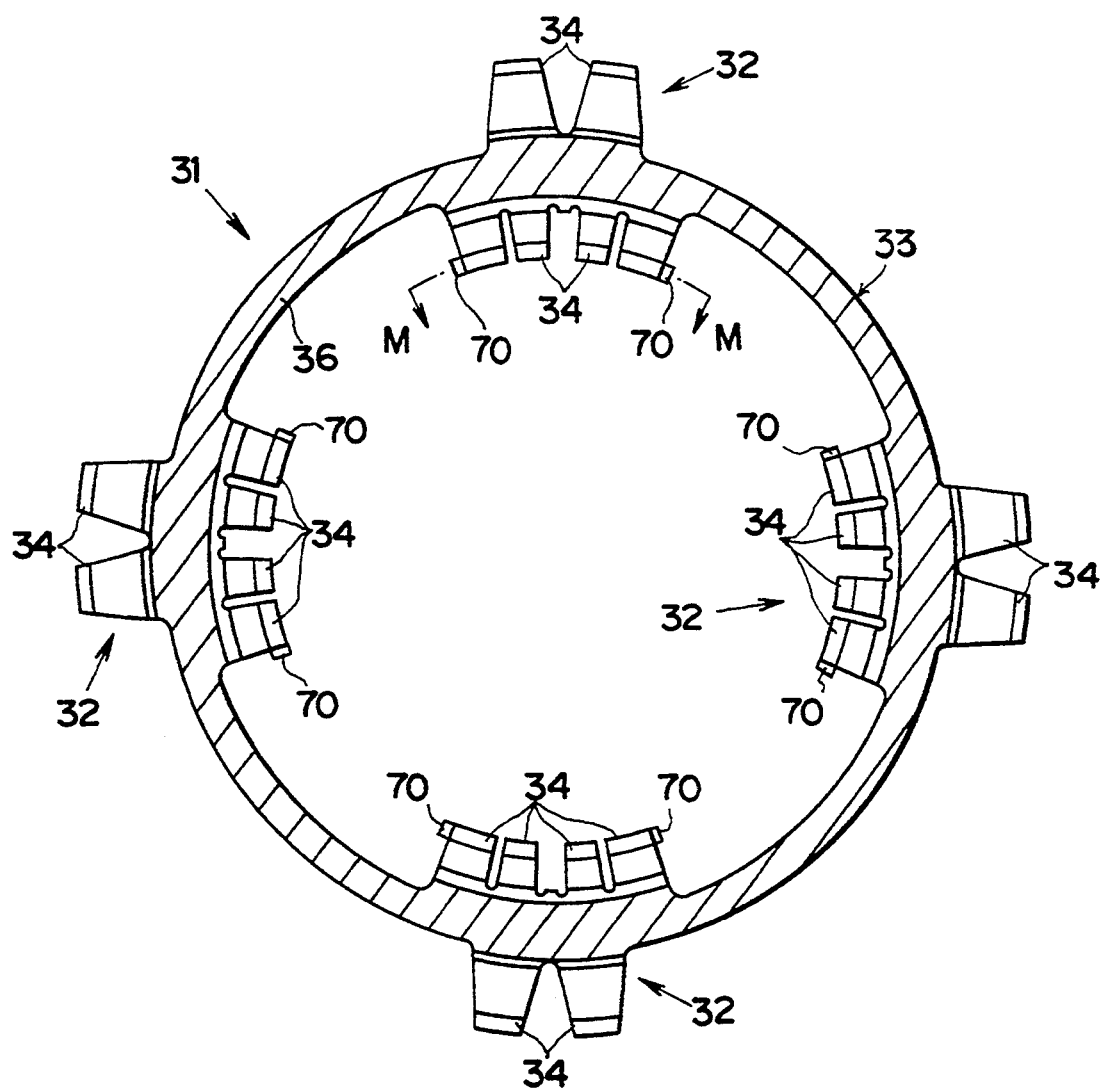
FIG. 31 is a front elevation showing the friction plate used in the embodiment shown in FIG. 29.
Figure 32:
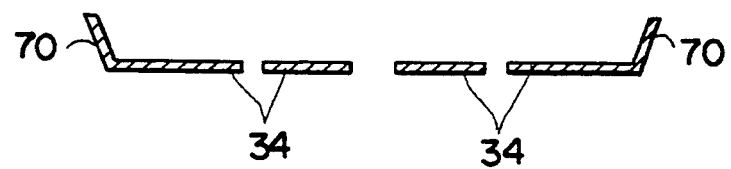
FIG. 32 is an enlarged section taken along line M—M of FIG. 31.
Figure 33:
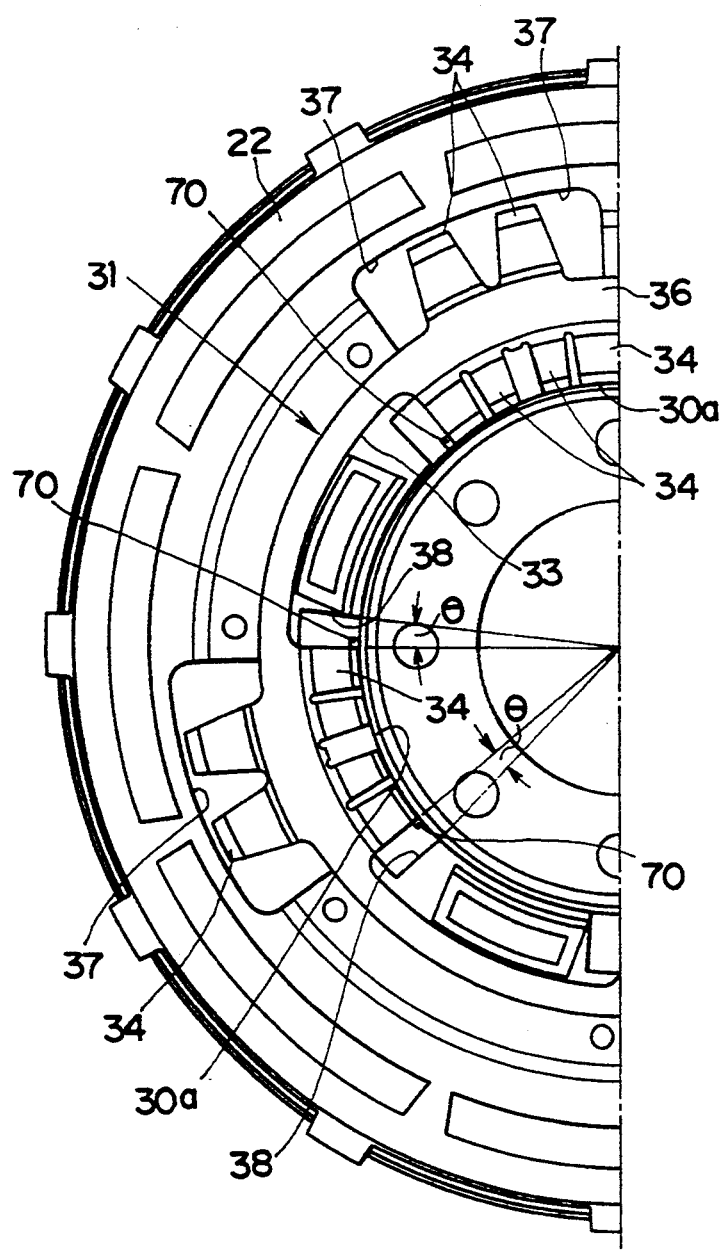
FIG. 33 is a section showing a portion of the assembly of the friction plate shown in FIG. 31.

On the other hand, the friction plate 31 used in the torque converter shown in FIG. 29 is shaped and assembled, as shown in FIGS. 31 to 33. Specifically, the friction plate 31 has an annular shape in its entirety and is equipped with the leaf spring portions 32 having spring actions, at the four portions of the ring portion 33 having a larger diameter than that of the aforementioned annular projection 25 of the main member 21. Each of these leaf spring portions 32 is formed by extending the plurality of elastic members 34 radially inward and outward, toward the damper mechanism 13 when it is mounted. The leaf spring portion 32 is equipped with four elastic members 34 at its inner circumference and two elastic members 34 at its outer circumference. The four inner elastic members 34 are disposed at the outer circumference of the projections 30a of the center plate 30 so that the friction plate 31 is supported by the center plate 30. Of one set of four elastic members 34, moreover, the two elastic members 34 located at the two circumferential sides are equipped at their outer edges with engagement portions 70 which are folded in the axial direction, as shown in FIG. 32. These engagement portions 70 are formed into cantilever members, as shown, so that they are elastically warped by applying a circumferential force to them.

Figure 34A:
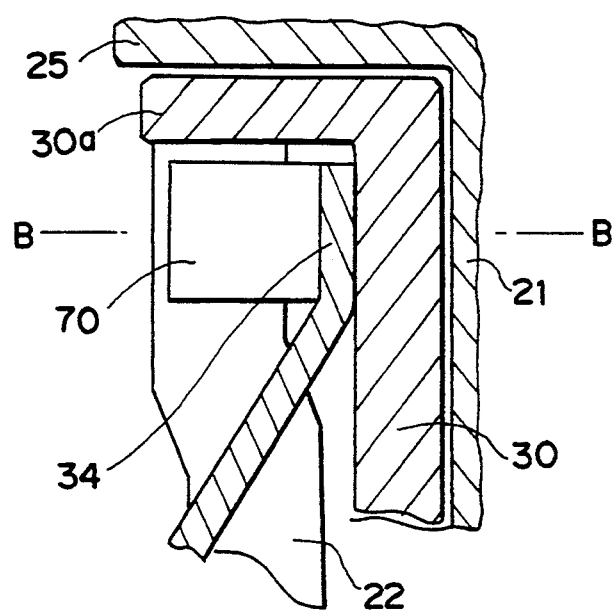
FIG. 34A is a section showing the relative position between an engagement portion and a damper mass.
Figure 34B:
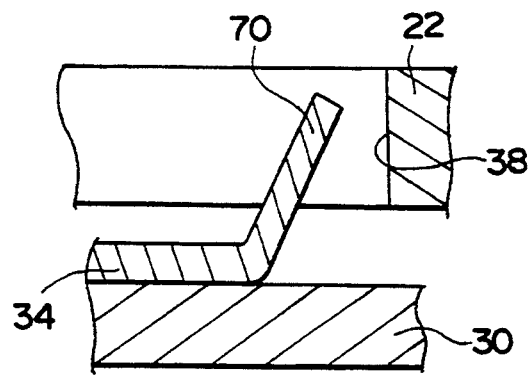
FIG. 34B is a section taken along line B—B of FIG. 34A.

Moreover, these engagement portions 70 are positioned to face the edges 38 of the wider portions of the punched portions 37, which are formed in the aforementioned cover member 22, generally in the circumferential direction, as shown in FIG. 34. The gap between the engagement portions 70 and the edges 38 is set to the value $\theta$ in terms of the central angle. In case, therefore, the damper mass 12 is rotated (or twisted) by the angle $\theta$ or more relative to the front cover 4 or the center plate 30, it comes into engagement with the friction plate 31 so that these two members rotate together. In case, on the other hand, the damper mass 12 is then relatively rotated (or twisted) by the angle $2\theta$ or more in the opposite direction, the damper mass 12 and the friction plate 31 likewise rotate together.

The action of the torque converter shown in FIG. 29 is basically identical to that of the torque converter shown in FIG. 1. Since, however, the elastic members 34 of the friction plate 30 are formed with the aforementioned engagement portions 70, the impact at the time of starting the engagement between the damper mass 12 and the friction plate 30 is damped, as will be emphasized in the following.

As has been described, if the input torque abruptly fluctuates, the damper mechanism 13 has its torsion angle increased. When this angle grows equal to the central angle θ made between the edges 38 of the aforementioned punched portions 37 and the edges 39 of the engagement portions 70, these members come into contact with one another so that the damper mass 12 rotates relative to the center plate 30 and the front cover 4 while pushing the friction plate 31. In this case, the edges 38 of the punched portions 37 come into abutment against the leading end portions of the engagement portions 70 to push these portions 70 relatively in the circumferential direction, so that the engagement portions 70 are elastically warped. If this elastic force exceeds the maximum static frictional force between the friction member 36 and the inner face of the front cover 4, the friction plate 31 slides with respect to the front cover 4. As a result, after the engagement portions 70 has begun to warp and before the friction plate 31 begins to slide, the value of the torque for establishing a predetermined torsion angle in the damper mechanism 13 increases substantially in proportion to the extent of warp of the engagement portions 70. This state is illustrated at point ②in the diagram of torsional rigidity of FIG. 35. After the friction plate 31 has begun to slide, the torque value increases according to the sliding frictional force, as illustrated at point ③ in FIG. 35.

If a fluctuation starts in a direction to drop the input torque so that the elastic energy is released as the damper springs slacken, the damper mechanism 13 has its torsion angle reduced so that its damper mass 12 leaves the friction plate 31. As a result, the torque transmission between the members at the drive side and the damper mass 12 is executed only through the damper springs 29, as illustrated at points ④ and ⑤ in FIG. 35.

Figure 35:
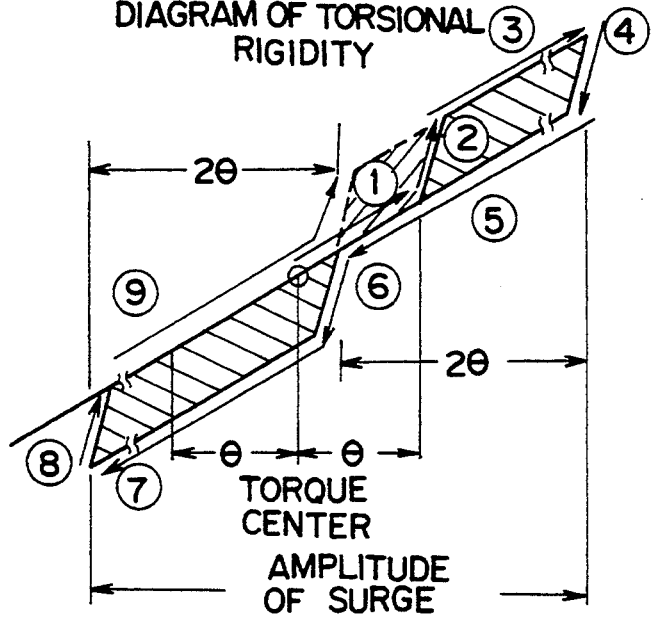
FIG. 35 is an enlarged diagram showing a portion of the rigidity diagram of the damper mechanism shown in FIG. 29.

When the deflection angle of the damper mechanism 13 increases in the opposite direction to the aforementioned one so that its reduced reaches from the beginning of reduction 2θ, the edges 38 at the opposite side of the punched portions 37 and the engagement portions 70 facing the former come into contact so that the friction plate 31 is rotated together with the damper mass 12 by the push of the damper mass 12. In this case, too, the torque transmission by the frictional force is effected between the front cover 4 and the damper mass 12. This torque transmission is illustrated in FIG. 35 along the segment containing points ⑥, ⑦ and ⑧, which is generally symmetric to the aforementioned segment containing points ②, ③ and ④. Incidentally, the curve indicating the segment of point ⑥ is inclined to the ordinate by the application of the elastic force of the engagement portions 70.

After this torsion in the negative direction has reached its limit, the forward torque transmission for feeding the torque from the drive side members is caused together with the torsion. When this torsion angle reaches the value 2θ, the friction plate 31 and the damper mass 12 come into engagement to rotate together so that a sliding resistance is established between the damper mass 12 and the front cover 4. This is illustrated at point ⑨ in FIG. 35. In this case, too, the curve indicating the segment of point ⑥ is inclined to the ordinate by the application of the elastic force of the engagement portions 70.

Thus, in the torque converter shown in FIG. 29, the torque to be exerted between the friction plate 31 and the damper mass 12 is gradually increased by the elasticity of the engagement portions 70, in case they are integrated to engage. As a result, it is possible to prevent any abrupt change in the torque transmission state and the accompanying shock. Moreover, the engagement portions 70 are elastically warped so that the error between the engagement portions 70 and the edges 38 of the punched portions 37 is allowed within the range of the elastic deformation of the engagement portions 70. Even if any of the engagement portions 70 abuts against the corresponding edge 38, it is warped to cause the remaining engagement portions 70 to come into abutment engagement with their corresponding edges 38. As a result, the machining accuracy required of the engagement portions 70 is lowered to facilitate the machining. Moreover, all the engagement portions 70 finally participate in the torque transmission so that any of them can be prevented from being excessively loaded. Still moreover, the individual engagement portions 70 contact in the face-to-face region with the edges 38 so that the facial pressure can be dropped to improve the durability.

Incidentally, the gap θ between the engagement portions 70 and the edges 38 is set to prevent the booming noise. Since the engagement portions 70 are made elastic to effect a gentle increase in the torque after they have begun to act, the booming noise preventing effect is not substantially influenced even if the gap θ between the engagement portions 70 and the edges 38 is reduced. In other words, the angular range relative to the front cover 4 can be increased while the friction plate 31 and the damper mass 12 being integrated through the engagement portions 70. Thus, the effect of preventing the surging phenomenon can be enhanced.

Other embodiments of the means for damping the impact at the time of the engagement between the damper mass 12 and the center plate 30 will be described in the following. In the embodiment shown in FIG. 36, the face of each of the engagement portions 70 facing the corresponding edge 38 is equipped with an elastomer 71. In the embodiment shown in FIG. 37, on the other hand, an elastomer 72 is attached to the edge 38.

Figure 36:
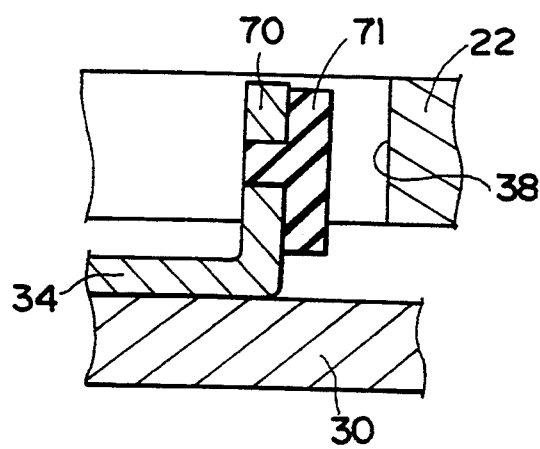
FIG. 36 is a section showing a portion of an example in which an elastomer is mounted on the engagement portion.
Figure 37:
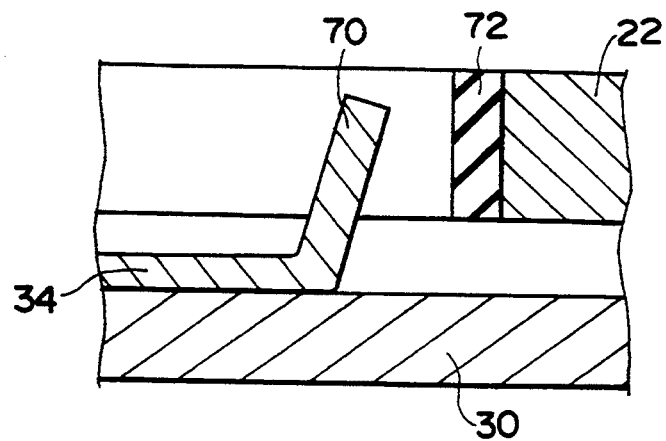
FIG. 37 is a section showing a portion of an example in which an elastomer is mounted on the punched portion.

According to both the structures shown in FIGS. 36 and 37, therefore, the elastic deformations of the elastomers 71 and 72 can damp the impact, which is caused when the friction plate 31 comes into engagement with the damper mass 12, and can prevent any excessive load from being locally applied. These effects are similar to those of the foregoing embodiments. Incidentally, in the embodiment shown in FIG. 36 or 37, the engagement portions 70 need not be elaborately made elastic.

As has been described with reference to FIGS. 8 and 9, according to the present invention, the aforementioned friction plate 31 can be replaced by the friction disc 42 which is equipped with the engagement pins 40 and the friction member 41. Specifically, the friction disc 42 is disposed radially internally of the annular projection 25 of the main member 21 such that its engagement pins 40 are loosely fitted in the slots 43 formed in the main member 21. In case this construction is adopted, elastomers are attached to the two end portions of the slots 43 such that the gap between the engagement pins 40 and the elastomers 73 can be set to have the angle 28 of the maximum allowing rotation relative to the engagement pins 40.

Figure 38:
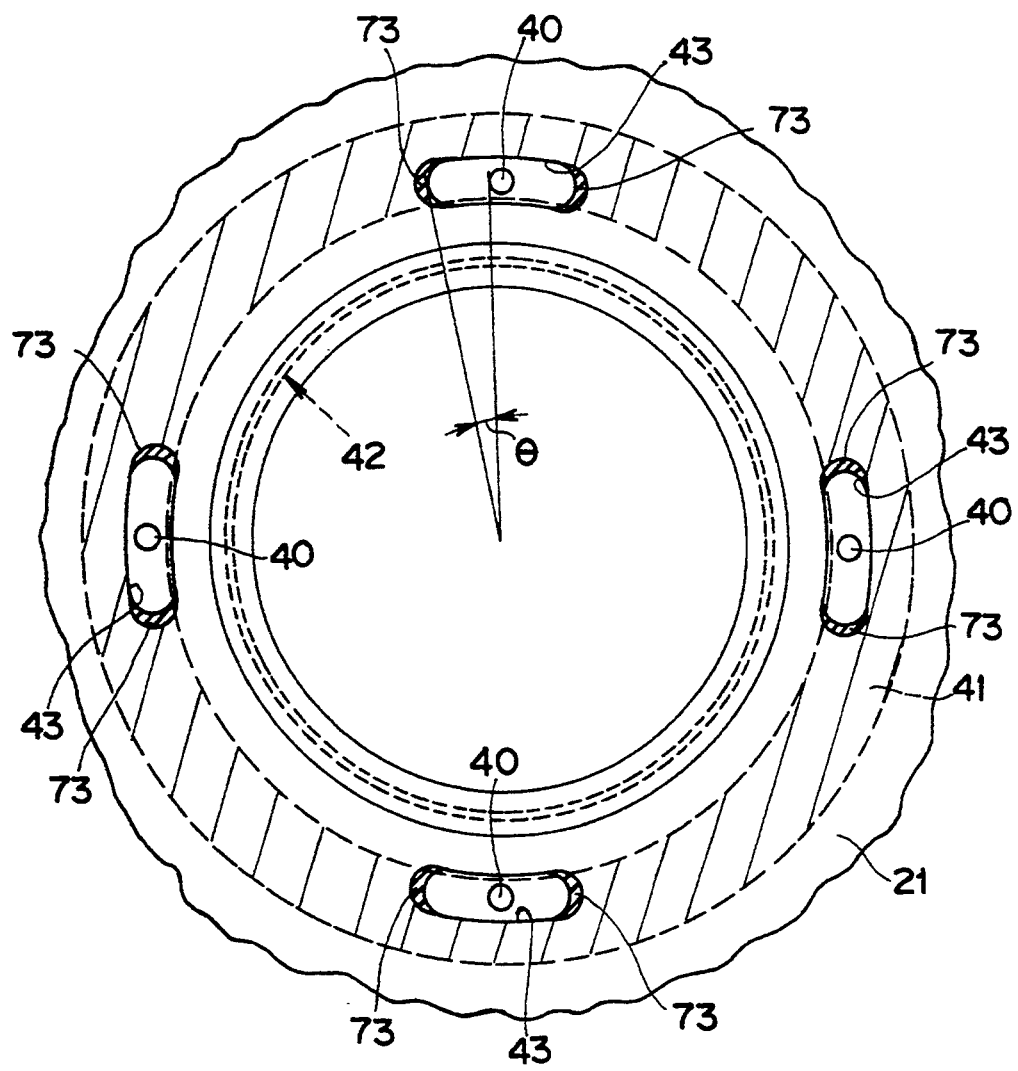
FIG. 38 is a front elevation showing a portion of an example in which elastomers are mounted on the two end portions of a slot having a pin fitted loosely therein.

Thus, even in case of the construction shown in FIG. 38, the elastic force by the elastomers 73 is exerted between the friction disc 42 and the damper mass 12 engaging with the former. The effects obtained are similar to those of the aforementioned individual embodiments such as the prevention of the engaging shock or the improvement in the durability.

Incidentally, the present invention should not be limited to the aforementioned individual embodiments but can be modified such that the aforementioned friction plate 31 is replaced by a backup plate. Specifically, this backup plate has a friction member adhered thereto and is pushed by the elastic members. On the other hand, the present invention may be so constructed that the sliding friction is established between the damper mass or the rotational inertial mass and the drive side members by the friction mechanism if the torsion angle of the damper mechanism exceeds the predetermined value. Thus, the construction and arrangement of the friction mechanism should not be limited to those of the foregoing individual embodiments. Furthermore, the present invention should not have its application limited to the torque converter but can be applied to a fluid coupling having no torque amplification.

The merits to be obtained from the present invention will be synthetically described in the following. According to the present invention, the frictional force for suppressing the rotation of the rotational inertial mass relative to the drive side members is established by the friction mechanism if the input torque fluctuates so highly as to cause a large torsion angle in the damper mechanism. As a result, it is possible to effectively prevent or suppress the surging phenomena which might otherwise be cased when the elastic energy stored in the damper mechanism is released. Moreover, the rotational inertial mass is connected to the drive side members through the elastic members, and the lockup clutch is made to engage with the rotational inertial mass, so that this construction is excellent in the characteristics of attenuating the vibration and can prevent the booming noise effectively.

According to the present invention, furthermore, the friction plate for establishing the frictional force is centered while being held by the rotational inertial mass or the drive side members. As a result, any local wear due to the excessive slippage or the abnormal deformation can be eliminated to provide an excellent effect of preventing the surging phenomenon and to improve the durability.

Furthermore, the present invention can be so constructed that the friction plate is pushed onto the front cover by the oil pressure for engaging the lockup clutch. Thus, a predetermined frictional force and the accompanying hysteresis can be achieved without being substantially influenced by the sizing accuracy of the friction member or another member contacting with the former. As a result, the surging phenomenon can be effectively prevented, and this preventing effect can be stabilized. Moreover, the size control of the parts such as the frictional member can be facilitated.

According to the present invention, furthermore, the elastic mechanism is arranged in the portion at which the rotational inertial mass comes into engagement with the friction mechanism so that the friction mechanism may slide relative to the drive side members. Thus, it is possible to damp the impact at the time when the friction mechanism slides to engage, thereby to prevent the deterioration of the riding comfort and the reduction of the durability.

What is claimed is:

1. A fluid coupling power transmission having a lockup clutch, in which a housing is formed by the shell of a pump impeller and a front cover integrally connected to said shell, in which a turbine runner facing said pump impeller is arranged in said housing, and in which said lockup clutch is disposed in said housing for transmitting torque selectively between said housing and an output member integrated with said turbine runner, comprising:

a damper mechanism including a rotational inertial mass being rotatable relative to said housing and selectively engageable with said lockup clutch, and elastic members arranged between said rotational inertial mass and a drive side member being rotatable together with said housing, and compressible by the relative rotation of said rotational inertial mass and said drive side member; and a friction mechanism which establishes a sliding frictional force for suppressing the rotation of said rotational inertial mass relative to said drive side member when the relative rotation exceeds a predetermined angle.

2. A fluid coupling power transmission having a lockup clutch according to claim 1, wherein said damper mechanism is coaxially arranged to face an inner face of said front cover and wherein said friction mechanism includes a friction plate arranged between said damper mechanism and the inner face of said front cover, and a friction member attached to said friction plate and contacting with the inner face of said front cover.

3. A fluid coupling power transmission having a lockup clutch according to claim 2, wherein said drive slide member includes a disc-shaped center plate being rotatable together with said front cover, wherein said rotational inertial mass includes a cover member arranged closer to said front cover than said center plate and formed with portions punched through a thickness thereof, and a main member clamping said center plate relatively rotatably together with said cover member, and wherein said friction plate includes elastic members fitted In said punched through portions and contacting with said center plate for pushing said friction member onto the inner face of said front cover.

4. A fluid coupling power transmission having a lockup clutch according to claim 3, wherein said friction plate includes a ring-shaped portion, and wherein said elastic members are protruded both radially inward and downward from said ring-shaped portion.

5. A fluid coupling power transmission having a lockup clutch according to claim 3, wherein said friction plate has engagement portions for engaging with inner edges of said punched through portions.

6. A fluid coupling power transmission having a lockup clutch according to claim 5, wherein said engagement portions include cantilever projections which elastically deform when pushed by said edges.

7. A fluid coupling power transmission having a lockup clutch according to claim 5,
further comprising elastic members mounted one of said edge portions and said engagement portions.

8. A fluid coupling power transmission having a lockup clutch according to claim 2,
wherein said friction plate is held coaxially with and by said rotational inertial mass.

9. A fluid coupling power transmission having a lockup clutch according to claim 8,
wherein said rotational inertial mass includes a projection projected toward said front cover, and
wherein said friction plate is fitted on the outer circumference of said projection.

10. A fluid coupling power transmission having a lockup clutch according to claim 2,
wherein said friction plate is held coaxially with and by said drive side member.

11. A fluid coupling power transmission having a lockup clutch according to claim 10,
wherein said drive side member includes a projection projected toward said front cover, and
wherein said friction plate is fitted on the outer circumference of said projection.

12. A fluid coupling power transmission having a lockup clutch according to claim 4,
wherein said main member includes a projection projected toward said front cover, and
wherein said friction plate has its inner elastic members fitted on the outer circumference of said projection and held coaxially with said rotational inertial mass.

13. A fluid coupling power transmission having a lockup clutch according to claim 4,
wherein said center plate includes a projection projected toward said front cover, and
wherein said friction plate has its inner elastic members fitted on the outer circumference of said projection and held coaxially with said drive side member.

14. A fluid coupling power transmission having a lockup clutch according to claim 2,
wherein said damper mechanism has limited rotational movement with respect to the front cover,
wherein said lockup clutch is arranged at the opposite side to said front cover across said damper mechanism, and
wherein said friction plate is pushed onto the inner face of said front cover as said damper mechanism is pushed toward said front cover by said lockup clutch.

15. A fluid coupling power transmission having a lockup clutch according to claim 14,
further comprising an oil pressure chamber formed between said damper mechanism and said front cover wherein said chamber is fed with a pressurized oil for engaging said lockup clutch, and
wherein said damper mechanism has a smaller pressure receiving area than that of said lockup clutch.

16. A fluid coupling power transmission having a lockup clutch according to claim 1,
wherein said drive side member includes a disc-shaped center plate made rotatable together with said front cover,
wherein said rotational inertial mass includes a cover member and a main member clamping said center plate in a relatively rotatable manner, and
wherein said friction mechanism includes a member held by said center plate in sliding contact with sides of said cover member and said main member.

17. A fluid coupling power transmission having a lockup clutch according to claim 1,
wherein said damper mechanism is coaxially arranged to face the inner face of said front cover, and
wherein said friction mechanism includes an elastic plate arranged between said damper mechanism and the inner face of said front cover for pushing said friction member elastically onto the inner face of said front cover, pins projected from said elastic plate and extending in an axial direction in parallel with said front cover, and arcuate slots formed in said damper mechanism for fitting said pins.

18. A fluid coupling power transmission having a lockup clutch according to claim 17,
further comprising elastic members mounted on one of the outer circumference of said pins and end portions of said slots.

* * * * *